United States Patent
Kearney

(10) Patent No.: US 11,625,598 B2
(45) Date of Patent: Apr. 11, 2023

(54) DEVICE AND METHOD FOR MACHINE-LEARNING STEP-SIZE ADAPTATION

(71) Applicant: ROYAL BANK OF CANADA, Montreal (CA)

(72) Inventor: Alexandra Kathleen Kearney, Edmonton (CA)

(73) Assignee: ROYAL BANK OF CANADA, Montreal (CA)

( * ) Notice: Subject to any disclaimer, the term of this patent is extended or adjusted under 35 U.S.C. 154(b) by 726 days.

(21) Appl. No.: 16/293,281

(22) Filed: Mar. 5, 2019

(65) Prior Publication Data

US 2019/0272467 A1 Sep. 5, 2019

Related U.S. Application Data

(60) Provisional application No. 62/638,874, filed on Mar. 5, 2018.

(51) Int. Cl.
*G06N 3/08* (2006.01)
*G06N 3/04* (2023.01)

(52) U.S. Cl.
CPC .......... *G06N 3/08* (2013.01); *G06N 3/0472* (2013.01)

(58) Field of Classification Search
CPC ........ G06N 3/08; G06N 3/0472; G06N 3/049; G06N 3/084

See application file for complete search history.

(56) References Cited

U.S. PATENT DOCUMENTS

2013/0110750 A1* 5/2013 Newnham ............... G06N 5/04
706/12
2018/0099408 A1* 4/2018 Shibata ................ B25J 9/1674

OTHER PUBLICATIONS

Ashique Mahmood, "Automatic Step-Size Adaptation in Incremental Supervised Learning", 2010, University of Alberta, pp. 1-100. (Year: 2010).*
Miljković et al., "Neural network Reinforcement Learning for visual control of robot manipulators", Available online Sep. 23, 2012, Expert Systems with Applications vol. 40, Issue 5, pp. 1721-1736. (Year: 2012).*
Richard S. Sutton, "Adapting Bias by Gradient Descent: An Incremental Version of Delta-Bar-Delta", AAAI'92: Proceedings of the tenth national conference on Artificial intelligence, Jul. 1992, pp. 171-176. (Year: 1992).*
Schraudolph et al., "Online Independent Component Analysis With Local Learning Rate Adaptation", Nov. 1999, NIPS'99: Proceedings of the 12th International Conference on Neural Information Processing Systems, pp. 789-795. (Year: 1999).*

(Continued)

*Primary Examiner* — Ying Yu Chen
(74) *Attorney, Agent, or Firm* — Norton Rose Fulbright Canada LLP

(57) ABSTRACT

Systems, devices, methods, and computer readable media for training a machine learning architecture include: receiving one or more observation data sets representing one or more observations associated with at least a portion of a state; and training the machine learning architecture with the one or more observation data sets, where the training includes updating the plurality of weights based on an error value, and at least one time-varying step-size value; wherein the at least one step-size value is based on a set of meta-weights which vary based on a stochastic meta-descent.

19 Claims, 17 Drawing Sheets

(56) References Cited

OTHER PUBLICATIONS

Barnard, E. (1993). Temporal-difference methods and markov models. IEEE Transactions on Systems, Man, and Cybernetics, 23(2):357-365.

Dabney, W. and Barto, A. G. (2012). Adaptive step-size for online temporal difference learning. In Association for the Advancement of Artificial Intelligence (AAAI).

Dawson, M. R., Sherstan, C., Carey, J. P., Hebert, J. S., and Pilarski, P. M. (2014). Development of the bento arm: An improved robotic arm for myoelectric training and research, vol. 14, pp. 60-64. Citeseer.

Edwards, A. L., Dawson, M. R., Hebert, J. S., Sherstan, C., Sutton, R. S., Chan, K. M., and Pilarski, P. M. (2016a). Application of real-time machine learning to myoelectric prosthesis control: A case series in adaptive switching. Prosthetics and orthotics international, 40(5):573-581.

Edwards, A. L., Hebert, J. S., and Pilarski, P. M. (2016b). Machine learning and unlearning to autonomously switch between the functions of a myoelectric arm. In 2016 6th IEEE International Conference on, Biomedical Robotics and Biomechatronics (BioRob), pp. 514-521. IEEE.

Mahmood, A. R., Sutton, R. S., Degris, T., and Pilarski, P. M. (2012). Tuning-free step-size adaptation. In 2012 IEEE International Conference on Acoustics, Speech and Signal Processing (ICASSP), pp. 2121-2124. IEEE.

Schraudolph, N. N. (1999). Local gain adaptation in stochastic gradient descent. In Artificial Neural Networks, 1999. ICANN 99. Ninth International Conference on (Conf. Publ. No 470), vol. 2, pp. 569-574. IET.

Sherstan, C., Modayil, J., and Pilarski, P. M. (2015). A collaborative approach to the simultaneous multi-joint control of a prosthetic arm. In 2015 IEEE International Conference on Rehabilitation Robotics (ICORR), pp. 13-18. IEEE.

Sutton, R. S. (1992). Adapting bias by gradient descent: An incremental version of delta-bar-delta. In Association for the Advancement of Artificial Intelligence (AAAI), pp. 171-176.

Sutton, R. S. and Barto, A. G. (1998). Reinforcement learning: An introduction. MIT press, Cambridge, Book Review.

Sutton, R. S., Modayil, J., Delp, M., Degris, T., Pilarski, P. M., White, A., and Precup, D. (2011). Horde: A scalable realtime architecture for learning knowledge from unsupervised sensorimotor interaction. In The 10th International Conference on Autonomous Agents and Multiagent Systems-vol. 2, pp. 761-768. International Foundation for Autonomous Agents and Multiagent Systems.

Van Seijen, H., Mahmood, A. R., Pilarski, P. M., Machado, M. C., and Sutton, R. S. (2016). True online temporal-difference learning Journal of Machine Learning Reasearch (JMLR), 17(145):1—40.

\* cited by examiner

DEVICE AND METHOD FOR MACHINE-LEARNING STEP-SIZE ADAPTATION

CROSS-REFERENCE TO RELATED APPLICATIONS

This application claims all benefit including priority to U.S. Provisional Patent Application 62/638,874, filed Mar. 5, 2018, and entitled "Device and method for machine-learning step-size adaptation", which is hereby incorporated by reference in its entirety.

FIELD

The present disclosure generally relates to the field of machine learning, and more specifically, to devices, systems and methods for machine-learning step-size adaptation.

BACKGROUND

Appropriate step-sizes are a determining factor of performance in machine learning architectures such as architectures involving reinforcement learning (RL) systems: they specify the rate at which a system learns from examples and how well the learned system generalizes to new data.

SUMMARY

While most applications of (RL) have a single scalar step-size for all features, in some applications, it would may be beneficial to have a unique step-size for each individual feature that is used to represent a state. The importance of different features may change over time and some features may convey more information than others; having unique step-sizes for each feature may, in some scenarios, address these problems. While having a step-size for each input can be powerful, it also introduces greater complexity in selecting parameter initialization. Even when using simple scalar step-sizes, searching for the best step-size is often time-consuming; in non-stationary settings there may be no single optimal step-size for all features at all times. In some embodiments, Incremental Delta-Bar-Delta (IDBD) is generalized for use with temporal-difference (TD) methods, (herein referred to as TIDBD). TIDBID uses a vector of step-sizes, where each individual step-size is adapted online through stochastic metadescent.

In some embodiments, TIDBID is implemented to be less sensitive to the selection of its meta-parameter.

In accordance with one aspect, there is provided a system for a machine learning architecture. The system includes at least one memory and at least one processor configured to provide the machine learning architecture for estimating a value function for at least a portion of a given state, the value function defined at least in part on a plurality of weights. The at least one processor is configured for: receiving one or more observation data sets representing one or more observations associated with at least a portion of a state; and training the machine learning architecture with the one or more observation data sets, where the training includes updating the plurality of weights based on an error value, and at least one time-varying step-size value; wherein the at least one step-size value is based on a set of meta-weights which vary based on a stochastic meta-descent.

In accordance with another aspect, there is provided a method for a machine learning architecture for estimating a value function for at least a portion of a given state, the value function defined at least in part on a plurality of weights. The method includes: receiving one or more observation data sets representing one or more observations associated with at least a portion of a state; and training the machine learning architecture with the one or more observation data sets, where the training includes updating the plurality of weights based on an error value, and at least one time-varying step-size value; wherein the at least one step-size value is based on a set of meta-weights which vary based on a stochastic meta-descent.

In accordance with another aspect, there is provided a device or system for determining a potential action in an observed environment. The device or system includes at least one memory and at least one processor configured to provide a machine learning architecture for estimating a value function for at least a portion of a given state, and generate one or more signals for communicating or causing the potential action to be taken based on the value function; where the machine learning architecture was trained based on updating the plurality of weights in the machine learning architecture based on an error value, and at least one time-varying step-size value; wherein the at least one step-size value is based on a set of meta-weights which vary based on a stochastic meta-descent.

In accordance with one aspect, there is provided a method for training a machine learning architecture. The method includes: receiving one or more data sets representative of the machine learning architecture; training the machine learning architecture using a step-size value which varies over time, wherein the step-size value is specified by a set of meta-weights which vary based on a stochastic meta-descent using a full-gradient; and applying new inputs to the machine learning architecture trained using the step-size value.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Figure 1:
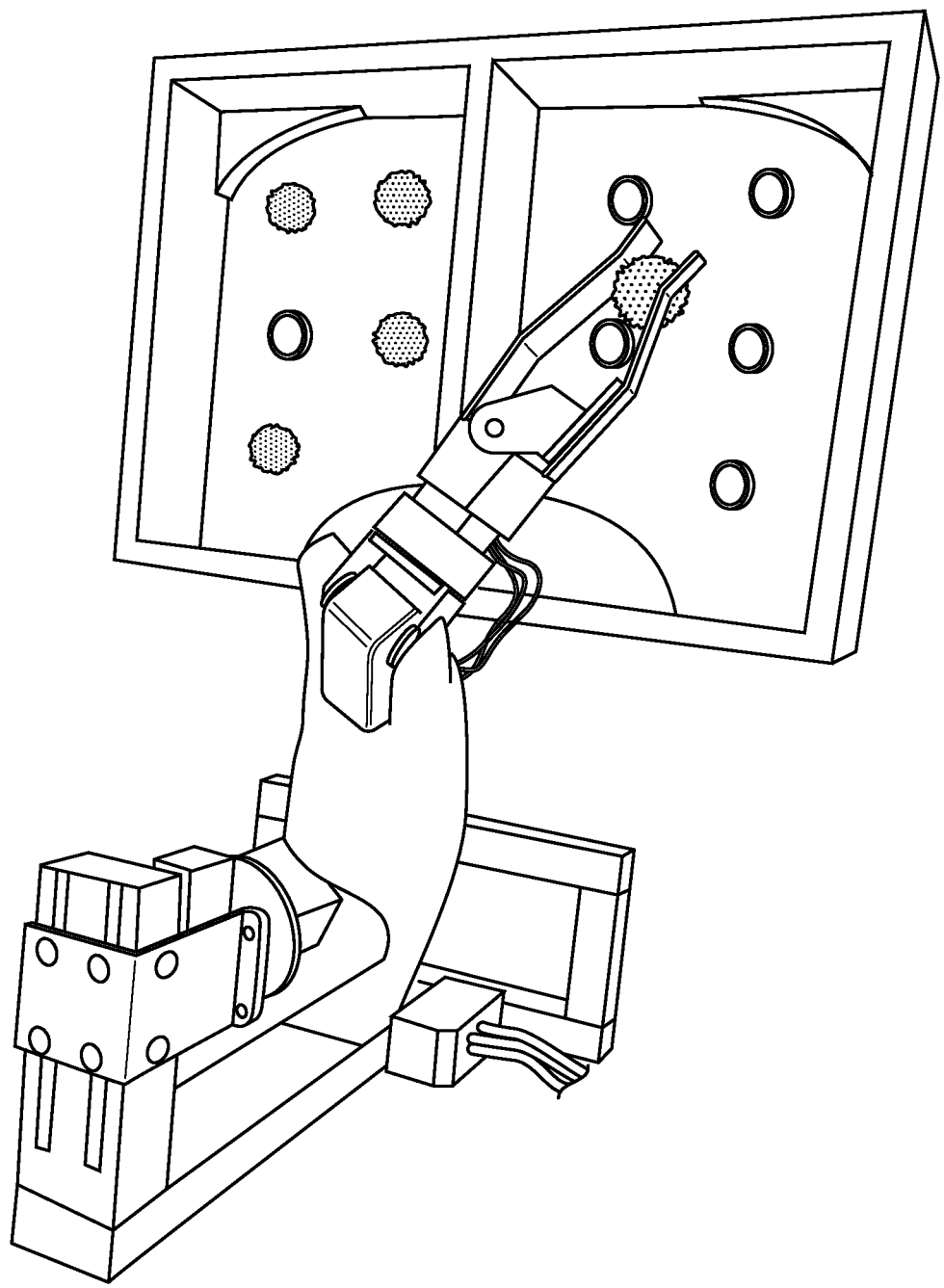
FIG. 1 is photo of an example robotic arm to which aspects of the present disclosure may be applied.

Embodiments of the present disclosure introduce a method for adapting step-sizes for temporal difference (TD) learning. How well an application of TD learning performs is often dependent on a well-chosen step-size; however, few methods have been developed for setting step-sizes automatically. Some methods adapt a single, scalar step-size to update of all weights. A vector of many step-sizes enables greater optimization by specifying parameters on a per-feature basis. Furthermore, adapting parameters at different rates acts as a method of representation learning-enabling features which are strongly related to the current task to have larger weight-updates and features which are irrelevant to the current task to have very small updates.

Some embodiments include an extension of TIDBD, a method of adapting step-size online for Temporal-Difference (TD) learning through Stochastic Meta-descent (SMD). As described below, different derivations of TIDBD have been analyzed by assessing their performance on a complex real-world robot prediction task. Having elaborated on the performance and the limitations of TIDBD, some embodiments were examined with a view to stabilizing TIDBD.

In some embodiments, methods from AutoStep (Mahmood et al., 2012) TIDBD can be made invariant to the setting of its meta step-size parameter. Following this, uses of learned step-sizes outside of weight-updates were examined. In some instance, step-sizes could be used for evaluating the potential of a predictor in early learning. In some instances, this may have potential to be used in conjunction with generate and test methods to build on the horde architecture-enabling it to create and evaluate predictions online through experience. Other uses of learned step-sizes may be possible.

The problem of how to set step-sizes automatically is an important one for machine learning. The performance of many learning methods depends on a step-size parameter that scales weight updates. To ease the burden on practitioners, it is desirable to set this step-size parameter algorithmically, and over the years many such methods have been proposed. Some of these are fixed schedules, but in principle it is better to adapt the step-size based on experience. Such step-size adaptation methods can be more suitable for large and long-lived machine learning systems, and are one focus of the present work.

When TIDBD was introduced by the author, two key traits in an adaptive step size method were discussed: the method should have a vector of many step-sizes, rather than a single global step-size, and the method should enable the step-sizes to increase and decrease in response to non-stationarity in the environment (Kearney et al.). A vector of many step-sizes is powerful, and it enables us to perform representation learning and tune step-sizes to specific features (Sutton, 1992; Schraudolph, 1999).

In the present disclosure, a third trait is described: an adaptive step-size method should be relatively insensitive to the setting of any meta parameters which it adds to the base learning algorithm. That is, there should be a wide margin of values for which an adaptive step-size method attains acceptable levels of error, and this range of values should be invariant across different problems.

In some embodiments and in certain situations, the aspects of the present disclosure may improve TIDBD such that it meets the remaining third criteria. In some embodiments, TIDBD is stabilized by making it less sensitive to the selection of its meta-parameter θ, and some of the uses of learned step-sizes are explored.

Some embodiments may create an adaptive step-size method which is suitable for prediction method which learns an estimate of a value function. Prediction problems are of importance to many real-world applications. Being able to anticipate the value of signal from the environment can be seen to be knowledge which is acquired through interaction (Sutton et al., 2011). For example, being able to anticipate the signal of a servomotor can inform a robot's decisions and form a key component of their control systems (Edwards et al., 2016a; Sherstan et al., 2015): predictions are a way for machines to anticipate events in their world and inform their decision-making processes.

Predictions may be thought of as estimating the value of a state in a Markov Reward Process (MRP). A MRP is described by the tuple $<S,p,r,\gamma>$ where S is the set of all states, $p(s'|s)$ describes the probability of a transition from a state $s \in S$ to a new state $s' \in S$, $r(s,s')$ describes the reward observed on a transition from s to s', and $0 \leq \gamma \leq 1$ is a discount factor which determines how future reward is weighted. The goal in an MRP is to learn a value function V (s) which estimates the expected return from a given state $v^*(s):= \mathbb{E}\{G_t|S_t=s\}$, where the return is $G_t:=\Sigma_{i=1}^{\infty}\gamma^{i-1}R_{t+i}$, or the discounted sum of all future rewards. Within the context of an MRP, a prediction is an estimation of the value of a state—the discounted future return of a signal. For example, the prediction signal could be the position of a robot's gripper, which is later used as an input into a robot's control system.

Temporal-Difference Incremental Delta Bar Delta (TIDBD) is an extension of IDBD to TD learning. As with conventional TD learning methods, TIDBD's task is to learn an estimate V (s|w) of the true value of a state v*(s), where w∈ℝ$^n$ is the weight vector. TIDBD estimates the value of a state using linear function approximation V(s|w)=w$^T$ϕ(s): the linear combination of a vector of learned weights w and a feature vector ϕ(s) (approximating the state s∈S. The weights w are updated as follows by moving them in the direction of the TD error δ by the step-size α, where 0<α. Note that unlike other TD methods, TIDBD's is specified for a specific time-step t, as its value changes over time.

Before modifying TIDBD, it can be re-derived it in two ways. The first, using a semi-gradient; the second, using an ordinary gradient. This disclosure does this re-derivation to re-introduce the method, along with some approximations; it also shows how different treatments of the gradient of the error with respect to weights impacts the stability and performance. Semi-gradient versus full gradient methods of deriving TIDBD were compared and the underlying cause of TIDBD's instability were analyzed. These conclusions may be used to guide stabilization of TIDBD.

IDBD adapts step-sizes by performing meta-gradient descent over a set of meta-weights β which are used to specify the step-size α. This is done online and incrementally. As shown in Algorithm 1, the meta-weights β are updated—as shown on line 5—by θxh, where θ is a positive constant meta step-size, x is the current observation, and h (update on line 8) is a trace of recent weight updates. This has the effect of updating β based on the correlation of weight updates.

If the weight updates are very correlated for a given feature, then it means that that feature is pertinent to a given prediction problem, and that it should have a larger step-size. In addition, it would have been a more efficient use of data to make one large update, rather than many smaller updates—justifying the use of a larger step-size.

On each time-step, the step-size vector α is defined by taking the exponential of the meta-weights β (line 6). By taking an exponential, the step-sizes are guaranteed to always be positive. In addition, by taking the exponential of our weights, when the architecture takes fixed steps θ in our β weights, it is actually taking geometric steps in α. This can, in some instances, be beneficial, as is moving by a fraction of its current value, enabling some weights to remain very small while others become large.

ALGORITHM I

Incremental Delta-Bar-Delta

1: Initialize vectors h ∈ 0$^n$, z ∈ 0$^n$, and
   w ∈ ℝ$^n$ and β ∈ ℝ$^n$
   arbitrarily; initialize a scalar θ;
   observe state S
2: Repeat for each observation x and target y:
3:   δ ← y − w$^T$x
4:   For element i = 1, 2, . . ., n:
5:     β$_i$ ← β$_i$ + θδx$_i$h$_i$
6:     α$_i$ ← exp(β$_i$)
7:     w$_i$ ← w$_i$ + α$_i$δx$_i$
8:     h$_i$[1 − α$_i$x$_i^2$]$^+$ + α$_i$δx$_i$ A possible criticism of IDBD is that it is only abstracting the problem of setting step-sizes to a higher level. Without IDBD, the system may be simplified by choosing a single scalar step-size α. With IDBD, the system still needs a single scalar meta step-size θ. While this criticism is true—IDBD still requires tuning of θ—this single meta step-size is used to update a vector of many step-sizes. In doing so, the system not only specifies the proportion of weight updates, it may in some situations also enable greater optimization and representation learning.

Many practitioners have an idea as to what the range of step-sizes are which yield acceptable performance. By creating a meta step-size those applying IDBD must re-learn how the value of the meta step-size impacts performance. If practitioners know the range of reasonable θ values, as they do with α values, then there is a tremendous upside to using an adaptive step-size. This is especially the case if the best values of θ exist in a range which the same over different problems. While ideal, this is not how IDBD reacts to different problems. The range of values which perform well changes from problem to problem (Sutton, 1992).

As a supervised method, IDBD almost meets my criteria for an adaptive step-size method. It's vectorized and it outperforms ordinary tuned supervised methods (Sutton, 1992). What IDBD lacks is robustness to the setting of the meta step-size. In a sense, IDBD doesn't change much for how practitioners apply a learning method to a target problem. The architecture is faced with the same task: choosing a single step-size value. However, with IDBD this single scalar value specifies the update of many step-sizes as opposed to simply one.

TIDBD's greatest flaw is that it does not meet my third criteria: TIDBD is sensitive to its metaparameter θ.

To stabilize IDBD it has been suggested that that β is bounded from below to −10 and that the update is limited to no more than +/−2 (Sutton, 1992). This is an unprincipled modification which covers up some of the drawbacks of IDBD without fully addressing them.

IDBD is derived as stochastic meta-descent for the Least-Means-Squared update rule. When deriving IDBD for TD learning, the question of how to treat the gradient of TD error arises. TD learning is not a true-gradient method (Barnard, 1993). TD learning uses bootstrapping: the error for a given value is dependent on not only the signal from the environment Rt, but also the predicted value of the following state v(s$_{t+1}$). In contrast, supervised learning methods are given the target when performing an update. While supervised methods are given the true target value, TD uses learned estimates to construct target value. As a result, the target value adapts through experience, adding non-stationarity to even stationary prediction problems.

When deriving IDBD for TD learning, one encounters the term $$\frac{\partial \delta}{\partial w}, \text{ or } \frac{\partial [R_t + \gamma v(\phi(s_{t+1})) - v(\phi(s_t))]}{\partial w}$$

when the TD error is expanded. When deriving TIDBD, the architecture can be designed to consider how to treat the gradient of the TD error. There are at least two options: simply taking the ordinary gradient, including the V(ϕ(s$_{t+1}$)), term, or taking the semi-gradient which omits it.

In different embodiments, IDBD is derived for TD in both ways, first using the ordinary gradient, then using the semi-gradient. The experiments which examine whether the advantages of IDBD carry over from supervised learning to TIDBD in TD learning use the semi-gradient derivation; however, the results are similar for ordinary gradient methods. The following sections present a more detailed discussion on what the impact of each derivation has on performance, alongside comparison to RMSPROP and AlphaBound.

Ordinary Gradient TIDBD

In some embodiments, TIDBD is derived as stochastic meta-descent using the ordinary gradient. The derivation of TIDBD starts by describing the update rule for $\beta$—the meta-weights with which the step-size is defined.

$$\beta_i(t+1) = \beta_i(t) - \frac{1}{2}\theta \frac{\partial \delta^2(t)}{\partial \beta_i} \tag{1}$$

TIDBD learns its step-size parameters $\beta$, by moving them in the direction of the meta-gradient $$\frac{\partial \delta^2(t)}{\partial \beta_i}.$$

Here, our meta step-size is $-\frac{1}{2}\theta$.

In (2), the $\beta$ update may be simplified by approximating $$\sum_j \frac{\partial \delta^2(t)}{\partial w_j(t)} \frac{\partial w_j(t)}{\partial \beta_i} \text{ as } \frac{\partial w_j(t)}{\partial \beta_i} \approx 0$$

where $i \neq j$. This may be done because the effect of changing the step-size for a particular weight will predominantly be on the weight itself; effects on other weights will be nominal.

$$\begin{aligned}
\beta_i(t+1) &= \beta_i(t) - \frac{1}{2}\theta \sum_j \frac{\partial \delta^2(t)}{\partial w_j(t)} \frac{\partial w_j(t)}{\partial \beta_i} \tag{2} \\
&\approx \beta_i(t) - \frac{1}{2}\theta \frac{\partial \delta^2(t)}{\partial w_i(t)} \frac{\partial w_i(t)}{\partial \beta_i}
\end{aligned}$$

$$\begin{aligned}
\beta_i(t+1) &\approx \beta_i(t) - \theta \delta(t) \frac{\partial \delta(t)}{\partial w_i(t)} \frac{\partial w_i(t)}{\partial \beta_i} \tag{3} \\
&= \beta_i(t) - \theta \delta(t) \frac{\partial [R + \gamma w^T \phi(s') - w^T \phi(s)]}{\partial w_i(t)} \frac{\partial w_i(t)}{\partial \beta_i} \\
&= \beta_i(t) - \theta \delta(t)[\gamma \phi(s') - \phi(s)] \frac{\partial w_i(t)}{\partial \beta_i} \\
&= \beta_i(t) - \theta \delta(t)[\gamma \phi(s') - \phi(s)] h_i(t)
\end{aligned}$$

Simplification of $\beta$'s update is completed by defining an additional memory vector H as $$\frac{\partial w_i(t+1)}{\partial \beta_i}.$$

The update for h is then derived.

$$\begin{aligned}
h_i(t+1) &= \frac{\partial w_i(t+1)}{\partial \beta_i} \tag{4} \\
&= \frac{\partial [w_i(t) + e^{\beta_i(t+1)} \delta(t) z_i(t)]}{\partial \beta_i} \\
&= h_i(t) + e^{\beta_i(t+1)} \delta(t) z_i(t) + e^{\beta_i(t+1)} \frac{\partial \delta(t)}{\partial \beta_i} z_i(t) +
\end{aligned}$$

-continued $$e^{\beta_i(t+1)} \frac{\partial z_i(t)}{\partial \beta_i} \delta_i(t)$$

This simplification leaves $$\frac{\partial \delta(t)}{\partial \beta_i},$$

derived in (5), and $$\frac{\partial z_i(t)}{\partial \beta_i}$$

derived in (6). The same approximation as in (2) may be used to simplify:

$$\begin{aligned}
\frac{\partial \delta(t)}{\partial \beta_i} &= \frac{\partial}{\partial \beta_i}[R + \gamma w^T \phi(s') - w^T \phi(s)] \tag{5} \\
&= \frac{\partial}{\partial \beta_i}\left[\sum_j R + \gamma w_j \phi_j(t) - w_j \phi_j(t)\right] \\
&\approx \frac{\partial}{\partial \beta_i}[R + \gamma w_i \phi_i(t) - w_i \phi_i(t)] \\
&= \gamma h_i \phi_i(t+1) - h_i \phi_i(t)
\end{aligned}$$

Then, the following is simplified:

$$\frac{\partial z_i(t+1)}{\partial \beta_i} = \frac{\partial}{\partial \beta_i}[\gamma \lambda z_i(t) + \phi_i(t)] = \frac{\partial z_i(t)\gamma\lambda}{\partial \beta_i} = 0 \tag{6}$$

It can be seen that (6) results in a decaying trace of the initialized value of the eligibility traces. Since eligibility traces are initialized to 0, this value will always be 0.

$$\begin{aligned}
h_i(t+1) &\approx h_i(t) + e^{\beta_i(t+1)}\delta(t)z_i(t) + e^{\beta_i(t+1)}[\gamma h_i\phi_i(t+1) - \tag{7} \\
&\quad h_i\phi_i(t)]z_i(t) + 0 e^{\beta_i(t+1)}\delta_i(t) \\
&= h_i(t)[1 + \alpha_i(t+1)z_i(t)[\gamma\phi_i(t+1) - \phi_i(t)]] + \\
&\quad \alpha_i(t+1)\delta(t)z_i(t)
\end{aligned}$$

The results from (5) and (6) can be taken to complete the definition of h's update. After positively bounding $[1-\alpha(t+1)\phi_i(t)z_i(t)]$, TIDBD can be seen to be a form of stochastic meta-descent for the parameter $\beta$ which updates the step-size. The update for H and $\beta$ may then be implemented directly as shown in Algorithm 2.

ALGORITHM 2

TIDBD($\lambda$) with full-gradient

1: Initialize vectors $h \in 0^n$, $z \in 0^n$, and both $w \in \mathbb{R}^n$ and $\beta \in \mathbb{R}^n$ arbitrarily; initialize a scalar $\theta$; observe state S
2: Repeat for each observation s' and reward R:
3:    $\delta \leftarrow R + \gamma w^T \phi(s') - w^T \phi(s)$

| ALGORITHM 2-continued |
| --- |
| TIDBD($\lambda$) with full-gradient |
| 4:   For element i = 1, 2, ..., n: |
| 5:     $\beta_i \leftarrow \beta_i + \theta\delta[\gamma\phi(s_{t+1}) - \phi(s_t)]H_i$ |
| 6:     $\alpha_i \leftarrow e^{\beta_i}$ |
| 7:     $z_i \leftarrow z_i\gamma\lambda + \phi_i(s)$ |
| 8:     $w_i \leftarrow w_i + \alpha_i\delta z_i$ |
| 9:     $H_i \leftarrow H_i[1 + \alpha_i z_i[\gamma\phi_i(s_{t+1}) - \phi_i(s_t)]] + \alpha_i\delta z_i$ |
| 10:   s $\leftarrow$ s' |

Semi Gradient

Having derived TIDBD Using an ordinary gradient, the semi-gradient is used, taking into account the impact of changing the weight vector or the estimate $V(\phi(s_t))_v$, but not on the target $R_t + \gamma V(\phi(s_{t+1}))$. While less robust than other forms gradient descent, semi-gradient methods have been shown to converge reliably and more quickly than true-gradient methods (Sutton and Barto, 1998).

One can start, as with the ordinary gradient, by defining the update of $\beta$. Note, that instead of using the full gradient of $[R_t + \gamma v(\phi(s_{t+1})) - v(\phi(t))]$, one uses the gradient of $[-v(\phi(s_t)]$ shown as $[-w_i(t)\phi_i(t)]$ on line 2 of equation 8.

$$\beta_i(t+1) \approx \beta_i(t) - \theta\delta(t)\frac{\partial \delta(t)}{\partial w_i(t)}\frac{\partial w_i(t)}{\partial \beta_i} \quad (8)$$

$$= \beta_i(t) - \theta\delta(t)\frac{\partial[-w_i(t)\phi_i(t)]}{\partial w_i(t)}\frac{\partial w_i(t)}{\partial \beta_i}$$

$$= \beta_i(t) + \theta\delta(t)\phi_i(t)\frac{\partial w_i(t)}{\partial \beta_i}$$

$$= \beta_i(t) + \theta\delta(t)\phi_i(t)h_i(t)$$

As before, $\beta$'s update is simplified by defining an additional memory vector h as $$\frac{\partial w_i(t+1)}{\partial \beta_i}.$$

$$h_i(t+1) = \frac{\partial w_i(t+1)}{\partial \beta_i} \quad (9)$$

$$= \frac{\partial[w_i(t) + e^{\beta_i(t+1)}\delta(t)z_i(t)]}{\partial \beta_i}$$

$$= h_i(t) + e^{\beta_i(t+1)}\delta(t)z_i(t) + e^{\beta_i(t+1)}\frac{\partial \delta(t)}{\partial \beta_i}z_i(t) +$$

$$e^{\beta_i(t+1)}\frac{\partial z_i(t)}{\partial \beta_i}\delta_i(t)$$

This simplification leaves $$\frac{\partial \delta(t)}{\partial \beta_i},$$

derived in (10), and $$\frac{\partial z_i(t)}{\partial \beta_i},$$

derived in (6). The same approximation as in (2) can be used to simplify:

$$\frac{\partial \delta(t)}{\partial \beta_i} = \frac{\partial}{\partial \beta_i}[-V(\phi(t))] \quad (10)$$

$$= \frac{\partial}{\partial \beta_i}\left[-\sum_j w_j(t)\phi_j(t)\right]$$

$$\approx \frac{\partial}{\partial \beta_i}[-w_i(t)\phi_i(t)] = -H_i(t)\phi_i(t)$$

The derivative of the trace $$\frac{\partial z_i(t+1)}{\partial \beta_i}$$

is the same in the semi-gradient case as in the ordinary case. It can be used as before to simplify for $h_i(t+1)$ $$H_i(t+1) \approx H_i(t) + e^{\beta_i(t+1)}\delta(t)z_i(t) - e^{\beta_i(t+1)}H_i(t)\phi_i(t)z_i(t) + \theta e^{\beta_i(t+1)}\delta_i(t) \quad (11)$$

$$\approx H_i(t)[1 - \alpha_i(t+1)\phi_i(t)z_i(t)] + \alpha_i(t+1)\delta(t)z_i(t)$$

The results from (10) and (6) are taken to complete the definition of h's update. After positively bounding $[1-\alpha(t+1)\phi_i(t)z_i(t)]$, TIDBD can be seen to be a form of stochastic meta-descent for the parameter $\beta$ which updates our step-size. The update for H and $\beta$ may then be implemented directly as shown earlier in Algorithm 3.

| ALGORITHM 3 |
| --- |
| TIDBD($\lambda$) with semi-gradient |
| 1: Initialize vectors $h \in 0^n$, $z \in 0^n$, and both $w \in \mathbb{R}^n$ and $\beta \in \mathbb{R}^n$ arbitrarily; initialize a scalar $\theta$; observe state S |
| 2: Repeat for each observation s' and reward R: |
| 3:   $\delta \leftarrow R + \gamma w^T \phi(s') - w^T \phi(s)$ |
| 4:   For element i = 1, 2, ..., n: |
| 5:     $\beta_i \leftarrow \beta_i + \theta\delta\phi_i(s)H_i$ |
| 6:     $\alpha_i \leftarrow e^{\beta_i}$ |
| 7:     $z_i \leftarrow z_i\gamma\lambda + \phi_i(s)$ |
| 8:     $w_i \leftarrow w_i + \alpha_i\delta z_i$ |
| 9:     $H_i \leftarrow H_i[1 - \alpha_i\phi_i(s)z_i]^+ + \alpha_i\delta z_i$ |
| 10:   s $\leftarrow$ s' |

Eligibility traces, denoted z on line 7, allow the currently observed reward to be attributed to previous experiences; eligibility traces can be thought of as a decaying history of visited states. One may make the distinction between two types of traces: accumulating traces (shown in Alg. 5), which simply continue adding to z for each visit; and replacing traces, which will replace the value z for each visit to a state. The former can cause instability, as features can have a weight greater than 1 given to their updates as a result of multiple visits to the same state. The TD error $\delta$ on Line 3 is the difference between the predicted return for the current state V (s|w) and the estimate of future return $R+\gamma V(s'|w)$. For a more detailed explanation on TD learning and eligibility traces, please consult the description given by Sutton and Barto (1998).

TIDBD adds to ordinary TD by updating the values of the step-size $\alpha$ on per-time-step basis; the step-size vector is defined using an exponentiation of the $\beta$ vector (Line 6). By exponentiating the step-size parameters, the step-size is always positive and the step-size moves by geometric steps. No fixed meta step-size would appropriate for all features; moving each feature's step-size by a percentage of its current value is beneficial.

The vector $\beta$ is the set of parameters adapted in order to change the step-size vector $\alpha$. On line 5, a meta step-size parameter $\theta$ is used to move $\beta$ at every time-step; $\beta$ is updated in the direction of the most recent change to the weight vector, $\delta\phi(s)$, as scaled by the elements of h. The vector h is a decaying trace of the current updates to the weight vector via $\delta\phi(s)$ and previous updates (Line 9). Here $[x]^+$ is x for x>0 and 0 for all other values of x.

This has the effect of changing $\beta$ based on what can be considered the correlation between current updates to our weight vector and previous updates. If the current weight update $\delta\phi(s)$ is strongly correlated with previous weight updates h, then the system makes many updates in the same direction and it would have been a more efficient use of data to have made a larger update instead. If the updates are negatively correlated, then the system has overshot the target value, and should have used smaller step-sizes and smaller updates.

Experimental Setup

To compare the variations of TIDBD, as in (Kearney et al.), predictions made on real-world robotic prosthetic data were used. As in using the representation from van Seijen et al. (2016), The position of the hand joint is predicted during a common prosthetic dexterity training task using data from Edwards et al. (2016a). These predictions are valuable, as predictions of joint positions can be used to modify the controls of a given system, improving the proficiency of users and easing the burden of controlling complex bionic limbs (Sherstan et al., 2015; Edwards et al., 2016a,b).

Figure 2:
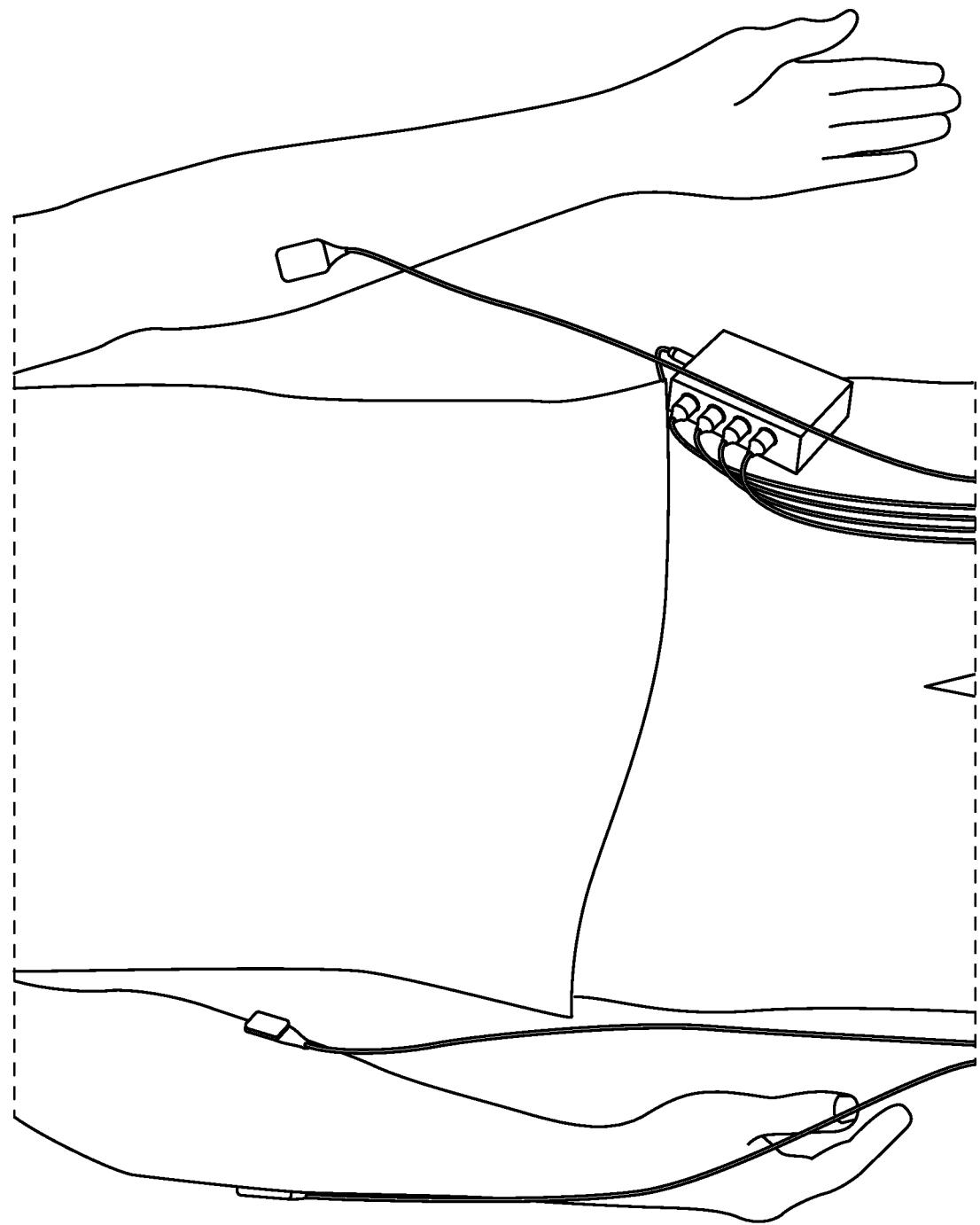
FIG. 2 is photo of an example robotic arm control mechanism to which aspects of the present disclosure may be applied.

In this experiment, able-bodied, non-amputee subjects performed the Box and Blocks training task: a problem where subjects use a prosthetic limb to move balls from one side of a divided box to the other. To perform this task, subjects used the Bento Arm (Dawson et al., 2014): a robotic limb developed as a research platform for prosthetic control (depicted in FIG. 1). The arm has a shoulder, elbow, wrist rotation, wrist flexion, and gripper servo. This task requires the user to move the arm to a ball, pick it up, and lift it up and over a wall to a specific position. The arm was myoelectrically controlled using electrodes placed on the forearms of each subject. These electrodes recorded signals produced by muscles during contraction which were then used by a control interface to operate the robot. The electrodes were placed on the wrist flexors and extensors of the subjects (depicted in FIG. 2). The flexors and extensors are opposing muscle groups, meaning that they do not co-contract. by flexing their arm in one direction, the subject could move the joint one way; by flexing their arm in the other direction, the joint would move in another direction. To change which joint they were operating on the limb, they would flex their other arm. This enabled the subjects to have bi-directional control of one joint on the limb the limb and an ability to switch between joints. For non-adaptive control interfaces, the order of list of joints which could be rotated through was fixed; for adaptive control interfaces, the order switched depending on which joint a system predicted a user would need next.

Four subjects performed six trials each: three using a non-adaptive control framework and three using an adaptive control (as described in Edwards et al. (2016a)). The inclusion of adaptive control frameworks adds non-stationarity to an already non-stationary prediction problem. This would suggest that no single, scalar step-size would be ideal at all times, as the prediction problem changes over time as either the user becomes more proficient at the problem, or the system begins to adapt the switching order for the limbs, the timing between actions will change and the prediction of the hand position will shift.

This non-stationarity makes it an ideal setting for analyzing adaptive step-size methods. Part of the challenge of finding an appropriate fixed step-size is that the fixed value needs to suit as many situations as possible. we should see an adaptive method improve over time to compensate.

Prediction Problem

A prediction problem is constructed where each algorithm predicts a signal of interest from the arm. As in (van Seijen et al., 2016), each algorithm is predicting the position of the hand signal. Tile-coding can be used to construct a binary feature vector. The vector was of size $2^{10}$ with 8 tilings and used the velocity of the hand, the position of the hand, alongside the EMG control signals to construct the feature vector. An additional bias feature was concatenated to the feature-vector, resulting in 9 active features at any given time.

Each method used a discounting factor $\gamma=0.95$. The adaptive methods shown all initialized their vector step-sizes to an initial value of log(⅑), which when exponentiated results in a step-size of ⅑. This initial step-size was the best of the step-sizes in the sweep shown in (Kearney et al.) for ordinary fixed step-size TD, making it an ideal step-size for comparison.

Stability

Each method at a variety of meta step-sizes are depicted in order to assess the sensitivity of each method to the setting of its meta step-size. The key criteria for the ideal adaptive step-size method which TIDBD does not meet is insensitivity to the setting of its meta-parameters. An adaptive step-size method which is highly unstable is not ideal. While it was demonstrated that TIDBD was able to out-perform ordinary fixed step-size TD, the range of values for which it was able and there's no guarantee that the range of acceptable parameters would be the same over multiple problems. Having to tune the methods on each new problem or domain defeats the purpose adapting the step-sizes in the first place.

Figure 3:
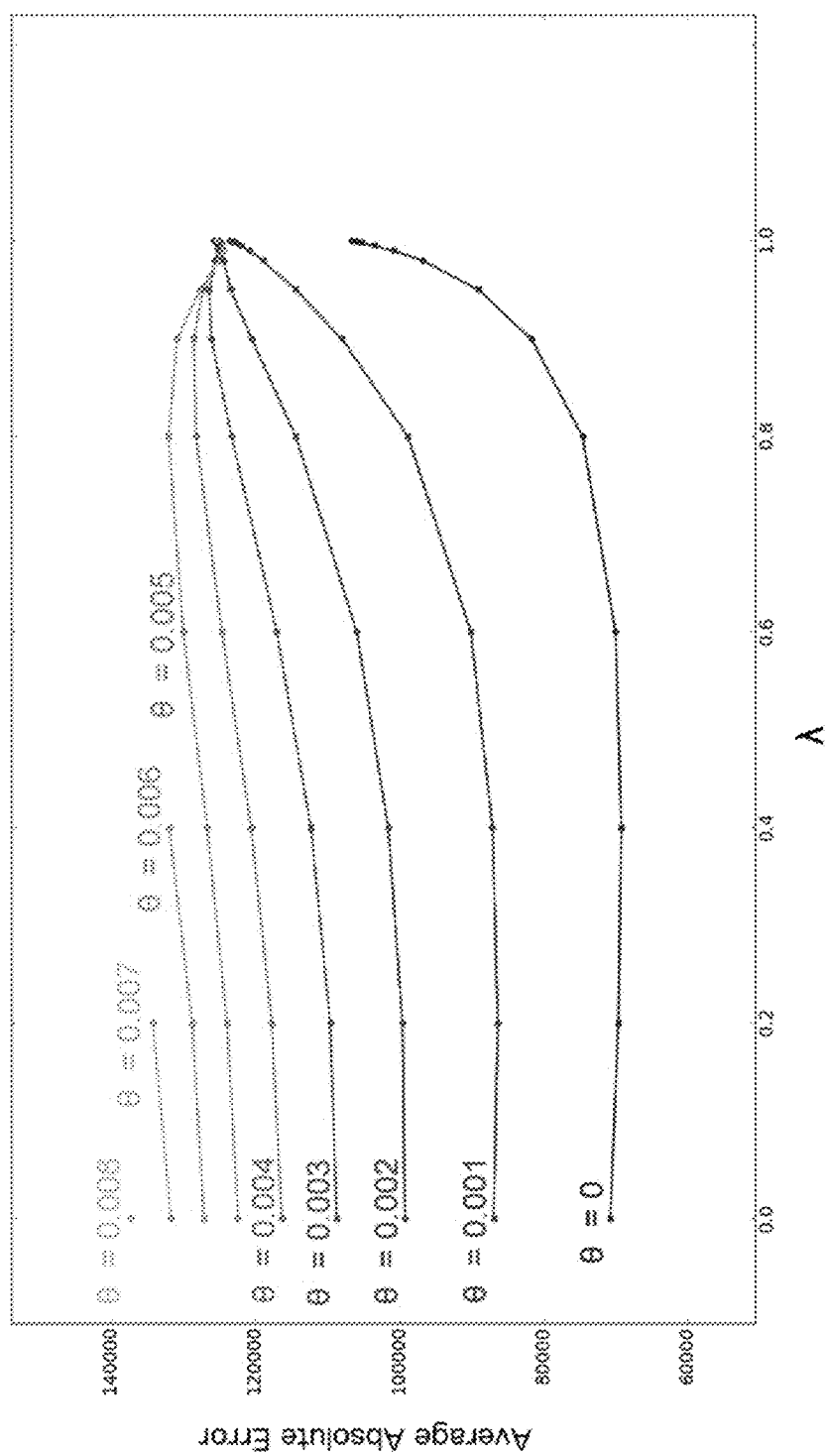
FIG. 3 is a graph illustrating an example performance of TIDBDR with semi-gradient.

In FIG. 3, the performance of TIDBD with replacing traces using a semi-gradient derivation is shown. In this derivation, the target value $R_t+\gamma V(s')$ is not considered; the system only uses the predicted value v(s). This sensitivity study highlights how TIDBD with a semi-gradient is quite stable, but is unable to out-perform ordinary TD for the values shown.

Figure 4:
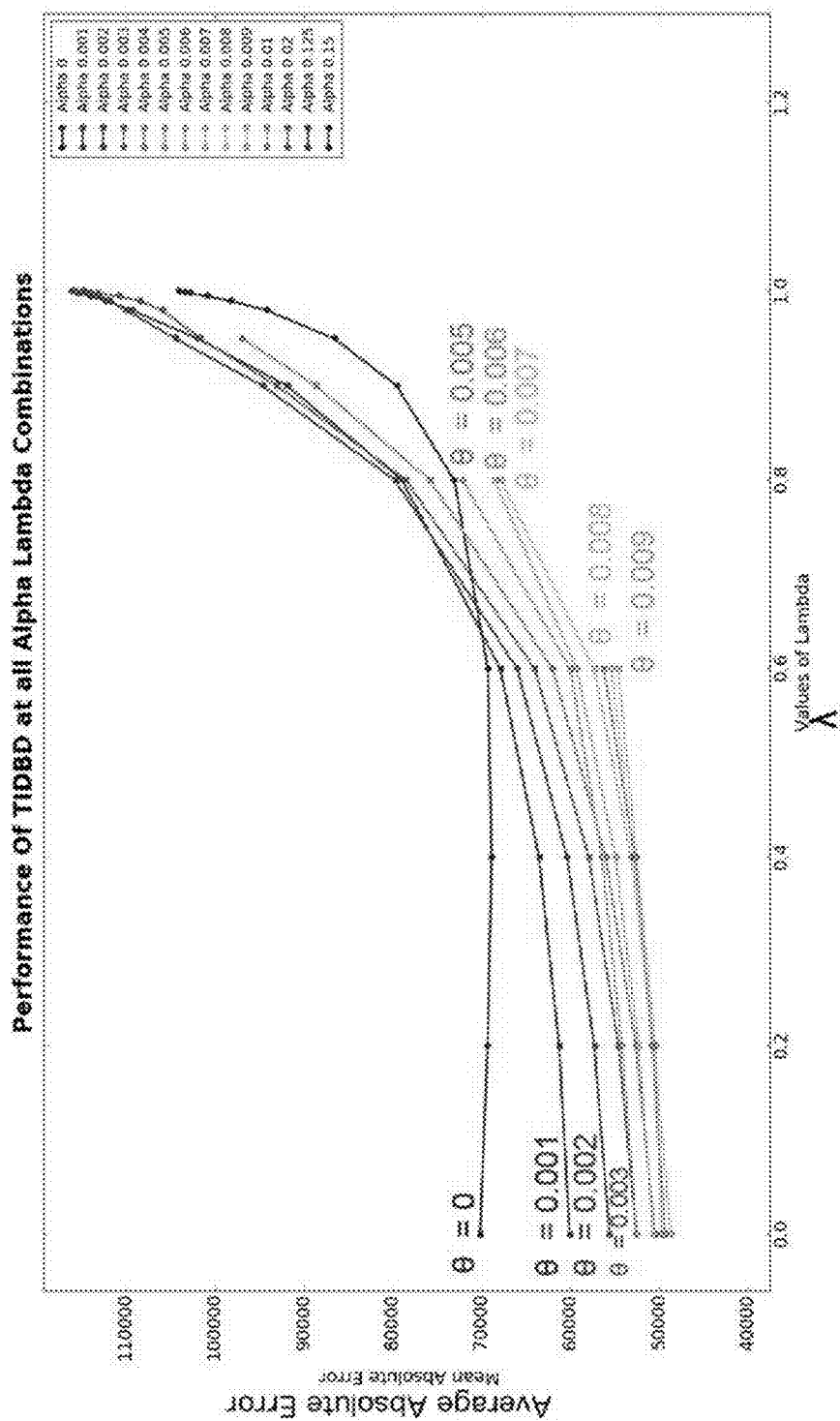
FIG. 4 is a graph illustrating an example performance with semi-gradient update and a true-gradient update to the update traces h.

In FIG. 4, the performance of semi-gradient TIDBD is shown again.

However, this version is updated so that instead of using a semi-gradient in the update to traces h, we use a full-gradient. One can see that this implementation of TIDBD is able to outperform ordinary TD for some values of $\theta$ for values of $\lambda<0.9$. These is a compromise between some of the robustness to $\theta$ choices from semi-gradient TIDBD and the performance of full-gradient TIDBD. This suggests that to a certain extent the performance of TIDBD is reliant on an accurate trace of historical weight updates.

Figure 5:
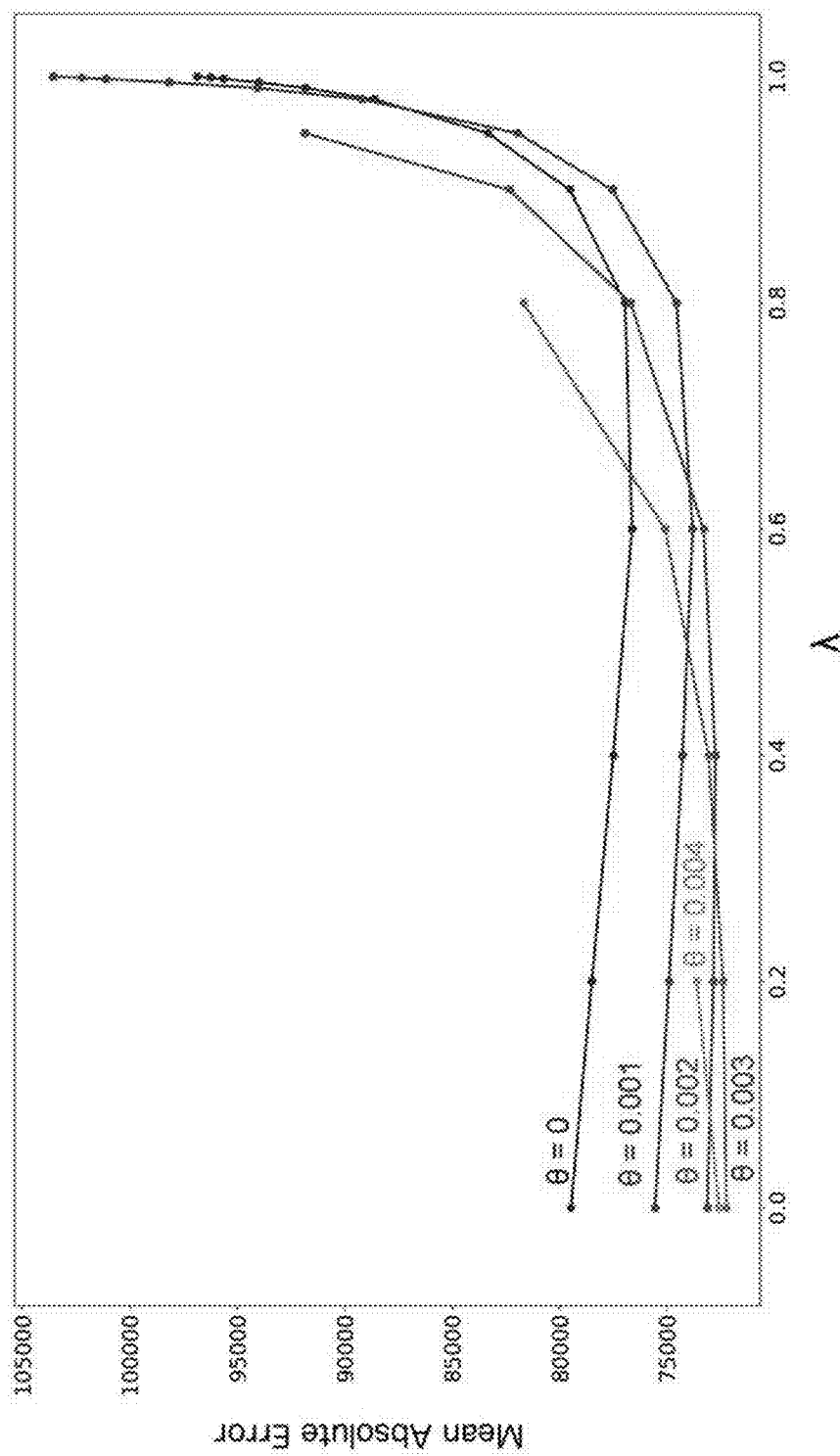
FIG. 5 is a graph illustrating an example performance of TIDBDR with full-gradient update.

Ordinary gradient TIDBD with replacing traces is shown in FIG. 5. While most of the meta step-size values yield better performance than ordinary fixed step-size TD learning, full gradient TIDBD is not stable. Already at $\lambda=0$ very few of the values of $\theta$ yield non-divergent performance. As λ gets larger, one can see that even fewer values of θ are able to maintain a reasonable error.

Figure 6:
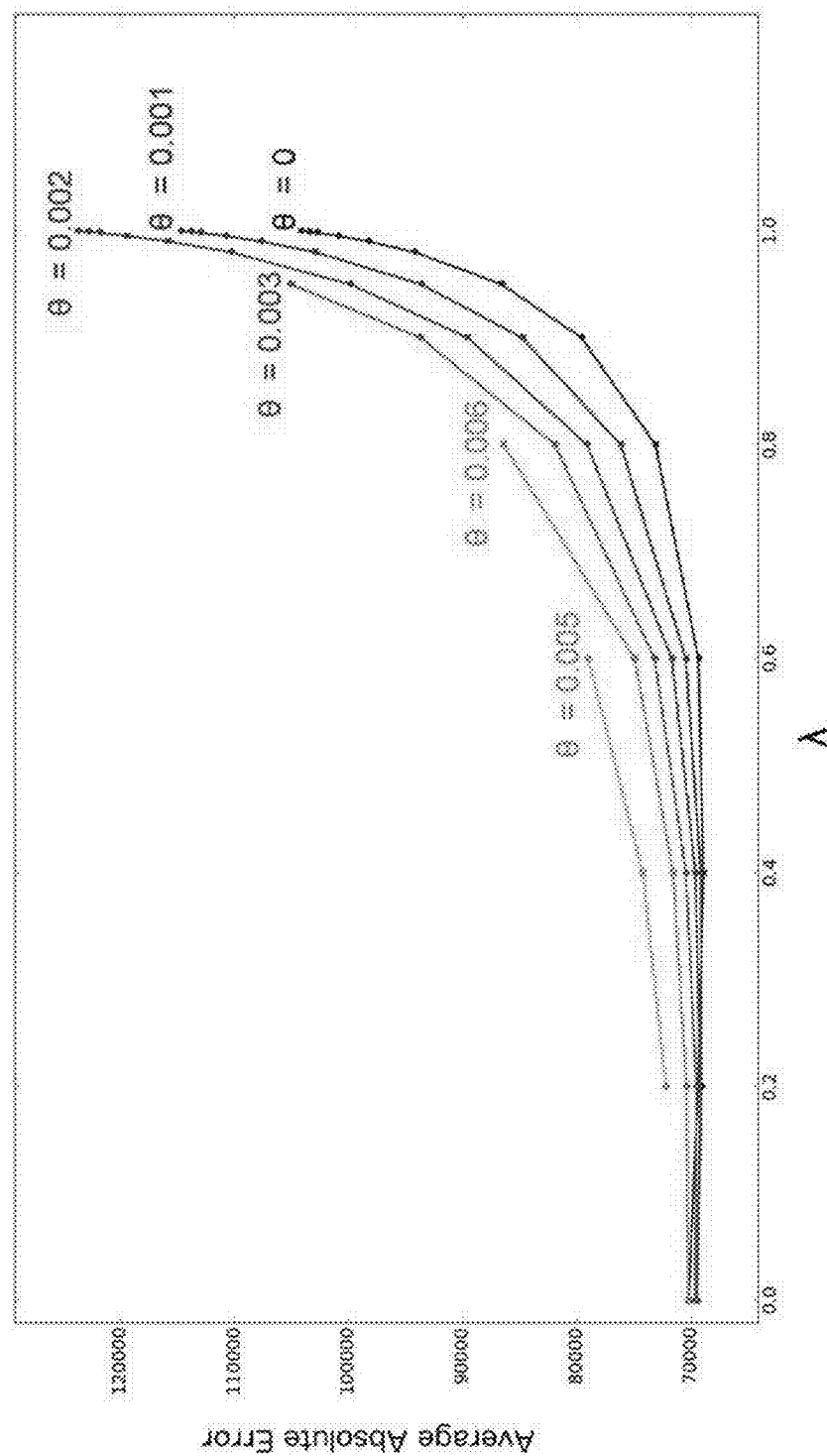
FIG. 6 is a graph illustrating an example performance of TIDBDR with full-gradient update and semi-gradient traces.

In FIG. 6, the performance of ordinary gradient TIDBD with semi-gradient h traces is shown. This sensitivity plot shows that using a semi-gradient h trace reduces the performance.

Looking at the difference permutations of handling the meta-weight update and handling the weight update history trace h, one can see a pattern. An ordinary gradient is necessary in the h traces for reasonable performance.

Based on the applicant's experience, the divergence originates largely in updates to β, even when the traces h are quite small. The semi-gradient helps mitigate this.

Clearly using an ordinary gradient for both the traces h and the meta-weights β is the best option when trying to achieve the best performance—the system is able to achieve lower average error than the underlying base algorithm. However, using an ordinary gradient makes step-size adaptation far more susceptible to divergence.

One of the criterion was the ability to be largely parameter free. That is, there should be a large range of meta-step size values for which performance is better than or equal to ordinary TD.

Stabilizing TIDBD

TIDBD showed promise in being able to compete with tuned ordinary TD—attaining average absolute errors below or at the same level of ordinary TD; the greatest weakness of TIDBD is its susceptibility to instability. As previously described, IDBD originally suggested that the step-sizes be capped to prevent underflow, and that the update to a feature be limited between +/−2 to prevent radical changes to the value of the step-sizes. In some embodiments, these constraints were not added, as they are unprincipled modifications; they cover-up some of the limitations of IDBD without actually fixing them. As described herein, in some embodiments, these problems may be addressed and may create a complete and stable version of TIDBD.

One of the benefits of a static shared step-size is that most reinforcement learning practitioners have an intuition of what range of values will yield acceptable performance in general; however, the optimal step-size value will vary from domain to domain. With TIDBD and other similar IDBD methods, the performance is dependent on a meta step-size—a value which there is little intuition as to how to set.

The applicant's original intuition for the instability which is seen in TIDBD was that the step-size values and the eligibility traces were interacting in a way such that both were attempting to achieve similar goals by doing maintaining a trace of historical weight updates. However, it is noted that in extreme situations where IDBD diverged the eligibility traces were not consistently large; that is, it was not the interaction between the eligibility traces and the adaptive step-sizes which were causing the divergence.

In other observations, AutoStep reduced sensitivity to the setting of the meta step-size and prevented divergence in the supervised learning setting (Mahmood et al., 2012; Dabney and Barto, 2012). To achieve this, a decaying average of weight updates was used to normalize the current weight update and an effective step-size—the amount by which the error was reduced on a given example—was used to ensure the update never overshot a given example. How autostep would be translated to temporal difference learning is unclear, as the target value $r_t + \gamma\phi(s_{t+1})$ is learned over-time, preventing one from creating a rigorous example of what overshooting would mean.

AutoStep

Autostep (Algorithm 4) adds two components to IDBD (Algorithm 1): a normalization of the inputs δxh with which we update our β meta-weights, and a normalization of the resulting step-size by the effective step-size.

To normalize the inputs, AutoStep maintains v, a running trace of recent weight updates (Line 5). At each time-step it takes the maximum between the current weight update |δxh| and a decay of the previous maximum $$v_i + \frac{1}{\tau}\alpha_i x_i^2 (|\delta x_i h_i| - v).$$

One might consider why the maximum is decayed rather than simply stored. In real-world data sources, noise and other outliers could distort the absolute recorded maximum, making the normalizer squash values into an unrepresentative range. By decaying the maximum, the system may be enabled to recover gracefully and gradually from such data.

On line 7, this normalizer v is used to make the update δxh unitless.

After the meta-weights have been updated, the resulting step-size α is normalized by the effective step-size (line 8). The effective step-size is a notion which is introduced to describe the amount by which we reduce the error by making a weight update.

AutoStep's changes to IDBD make it less sensitive to the choice of θ, although the reasons for this are not known, and it is not clear to what extent this generalizes. In addition to reduced sensitivity to the meta step-size θ, AutoStep is also less sensitive to its initial step-size setting for β. Continuing this trend of relative insensitivity, τ. While it adds a parameter to IDBD, AutoStep behaves like a parameter-free method, making it an ideal starting point for stabilizing TIDBD.

---
Algorithm 4 AutoStep
---

1: Initialize vectors $h \in 0^n$, $z \in 0^n$, and both $w \in \mathbb{R}^n$ and $\beta \in \mathbb{R}^n$ arbitrarily; initialize a scalar θ; observe state S
2: Repeat for each observation x and target y:
3:     $\delta \leftarrow y - w^T x$
4:     For element i = 1, 2, ..., n:
5:    
$$v_i \leftarrow \max\left(|\delta x_i h_i|, v_i + \frac{1}{\tau}\alpha_i x_i^2 (|\delta x_i h_i| - v)\right)$$

6:     If $v_i \neq 0$:
7:    
$$\alpha_i \leftarrow \alpha_i \exp\left(\mu \frac{\delta x_i h_i}{v_i}\right)$$

8:     $M \leftarrow \max(\Sigma(\alpha_i x_i^2), 1)$
9:     For element i = 1, 2, ..., n:
10:     $\alpha_i \leftarrow \frac{\alpha_i}{M}$
11:     $w_i \leftarrow w_i + \alpha_i \delta x_i$
12:     $h_i(1 - \alpha_i x_i^2) + \alpha_i \delta x_i$ While the AutoStep authors mentioned extending AutoStep to TD learning, it was never done. Here, the normalization and overshooting protection from AutoStep are applied to ordinary gradient TIDBD.

AutoStep prevents divergence by normalizing the current step-size by the effective step-size $\alpha^T x^2$—the amount by which the error on the current example is reduced by updating the weight vector. If the effective step-size is greater than one, then the system has over-corrected on a given example. If the system divides the step-size by the effective step-size before performing a weight update in this instance, it may be ensured that the system does not overshoot. This normalization prevents divergence.

The system calculates the effective step-size by taking the difference between the error before the weight update $\delta_t(t)$ and the error after the weights have been updated $$\delta_{t+1}(t), \text{ or } \frac{\delta_t(t) - \delta_{t+1}(t)}{\delta_t(t)}.$$

The system calculates the error $\delta_{t+1}(t)$ using the weights from time-step t+1 and the observation from time-step t.

For supervised learning, for an effective step-size, there is a known target value, so the error reduced on a given time-step is directly observable. However, as previously mentioned, TD learning uses bootstrapping. For TD learning the effective step-size is not an exact value, but an estimation dependent on how accurate a value-function is in estimating the value of the following step.

$$\frac{\delta_t(t) - \delta_{t+1}(t)}{\delta_t(t)} = \frac{[R_t + \gamma v_t(\phi(s_{t+1})) - v_t(\phi(s_t))] -}{\delta(t)} \quad (12)$$

$$= \frac{[\gamma v_t(\phi(s_{t+1})) - v_t(\phi(s_t))] - [\gamma(v_t(\phi(s_{t+1})) +}{\delta(t)}$$
$$\frac{(\alpha \delta z)^T \phi(s_{t+1})) - (v_t(\phi(s_t)) + (\alpha \delta z)^T \phi(s_t)]}{\delta(t)}$$

$\delta_{t+1}(t)$ is expanded as the TD error of the current time-step t using the value-functions from the following time-step, $v_{t+1}$. Value functions may be written recursively as the sum of the previous time-step's value-function $v_t(\phi(s_t))$ and the current weight update $\alpha(t)\delta_t(t)z(t)$. So, $$v_{t+1}(\phi(s_t)) = v_t(\phi(s_t)) + [\alpha(t)\delta(t)z(t)](\phi(s_t)) \quad (13)$$

$$\frac{\delta_t(t) - \delta_t(t)}{\delta_t(t)} = \frac{[\gamma v_t(\phi(s_{t+1})) - \gamma v_t(\phi(s_{t+1})] - [v_t(\phi(s_t)) - v_t(\phi(s_t))] -}{\delta(t)}$$
$$= \frac{-[\gamma \alpha \delta z \phi(s_{t+1})) - \alpha \delta z \phi(s_t)]}{\delta(t)}$$
$$= -(\alpha z)^T [\gamma \phi(s_{t+1}) - \phi(s_t)]$$

The resulting effective step-size is $-(\alpha z)^T[\gamma\phi(s_{t+1})-\phi(s_t)]$. This is an intuitive result, as the amount by which the system may reduce the error on a given example is the difference between the update made to the features active in the target $\phi(s_{t+1})$ and the changes made to the features in the state whose value being estimated $\phi(s_t)$. It may also be similar to the decay term in the update of h: $H_i \leftarrow H_i[1+\alpha_i[\gamma\phi_i(s_{t+1})-\phi_i(s_t)]z_i]^+ + \alpha_i\delta z_i$.

With the effective step-size defined, what remains in defining an AutoStep inspired TIDBD is the weight-update's normalizing term. AutoStep simply maintains a running trace of the absolute value of the weight-updates $$\max\left(|\delta x_i h_i|, v_i + \frac{1}{\tau}\alpha_i x_i^2(|\delta x_i h_i| - v)\right).$$

The absolute weight update for TIDBD is $|\delta[\gamma\phi(s_{t+1})-\phi(s_t)]H|$, and the current active step-size is $\alpha[\gamma\phi(s_{t+1})-\phi(s_t)]$. Thus, the trace $\eta$ of the maximum weight update would be $$\max\left(|\delta[\gamma\phi_i(s_{t+1}) - \phi_i(s)]H_i|, \eta_i + \frac{1}{\tau}\alpha_i[\gamma\phi_i(s_{t+1}) - \phi_i(s)]z_i(|\delta\phi_i(s)H_i| - \eta_i)\right).$$

| | Algorithm 5 AutoStep Style Normalized TIDBD($\lambda$) |
|---|---|
| 1: | Initialize vectors $h \in 0^n$, $z \in 0^n$, and both $w \in \mathbb{R}^n$ and $\beta \in \mathbb{R}^n$ arbitrarily; initialize a scalar $\theta$; observe state S |
| 2: | Repeat for each observation s' and reward R: |
| 3: | $\delta \leftarrow R + \gamma w^\tau\phi(s') - w^\tau\phi(s)$ |
| 4: | For element i = 1, 2, . . ., n: |
| 5: | $\eta_i \leftarrow \max(|\delta[\gamma\phi_i(s_{t+1}) - \phi_i(s)]H_i|, \eta_i + \frac{1}{\tau}\alpha_i[\gamma\phi_i(s_{t+1}) - \phi_i(s)]z_i(|\delta\phi_i(s)H_i| - \eta_i))$ |
| 6: | For element i = 1, 2, . . ., n: |
| 7: | $\beta_i \leftarrow \beta_i + \theta\frac{1}{\eta_i}\delta[\gamma\phi_i(s_{t+1})) - \phi_i(s)]H_i$ |
| 8: | $M \leftarrow \max(-e^{\beta_i}[\gamma\phi_i(s_{t+1}) - \phi_i(s)]^\tau z_i, 1)$ |
| 9: | $\beta_i \leftarrow \beta_i - \log(M)$ |
| 10: | $\alpha_i \leftarrow e^{\beta_i}$ |
| 11: | $z_i \leftarrow z_i\gamma\lambda + \phi_i(s)$ |
| 12: | $w_i \leftarrow w_i + \alpha_i\delta z_i$ |
| 13: | $H_i \leftarrow H_i[1 + \alpha_i[\gamma\phi_i(s_{t+1}) - \phi_i(s)]z_i]^+ + \alpha_i\delta z_i$ |
| 14: | $s \leftarrow s'$ |

Figure 7:
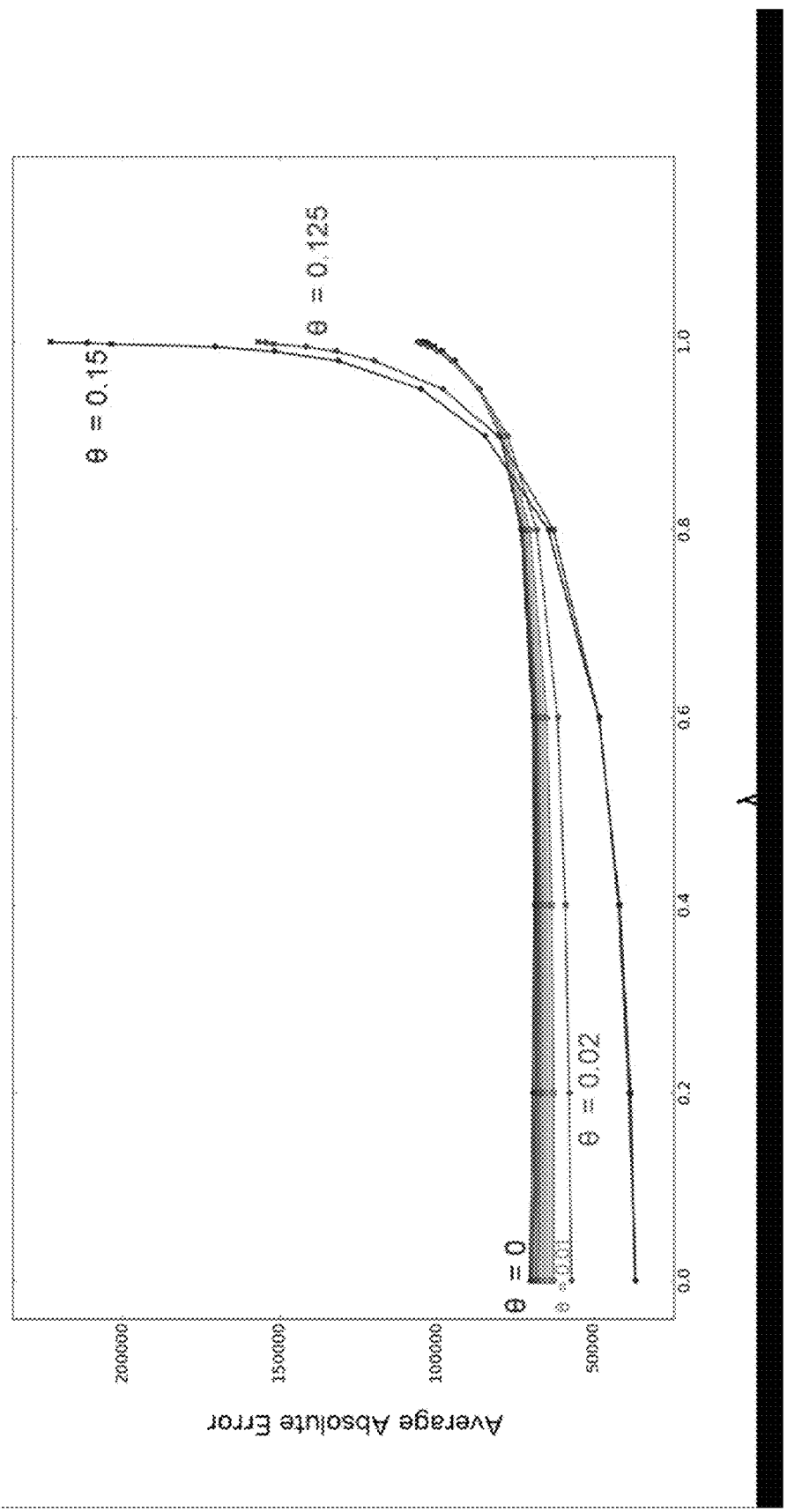
FIG. 7 is a graph illustrating an example performance of AutoStep inspired TIDBDR.
Figure 8:
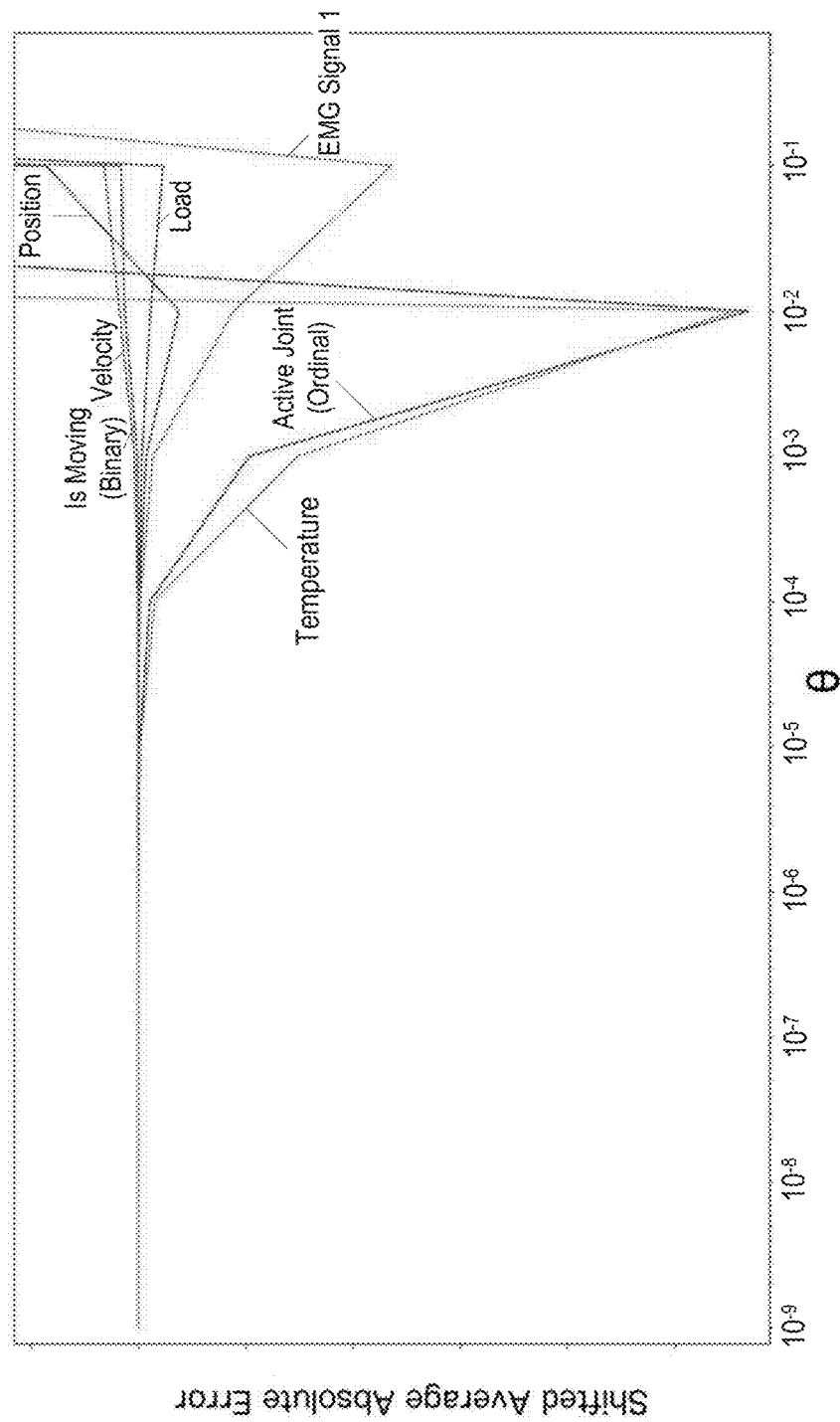
FIG. 8 is a graph illustrating an example performance of AutoTIDBDR across different θ clues at an initial λ of 0.9 and an initial α of 1 divided by the number of active features.

AutoTIDBD was assessed by running it on the same prosthetic prediction problem described in previous Prediction Problem. In FIGS. 7 and 8, the performance of AutoTIDBD for a variety of meta step-size $\theta$ values is shown. Like previous TIDBD experiments, AutoStep is set with an initial value of $\frac{1}{9}$, where 9 is the number of active features at a given time-step.

Values ranging between $0<\theta<10^{-2}$ have much less variance than the original TIDBD methods: AutoTIDBD is less sensitive to its setting of $\theta$ than the original TIDBD method. This trend is consistent, even amongst larger values of $\lambda$—values which caused divergence for ordinary TD prediction. Promisingly, AutoTIDBD does not diverge catastrophically, even for the most aggressive values of $\theta$. This is a major improvement over ordinary TIDBD. What we see is that there are a wide range of $\theta$ values for which TIDBD does not diverge, and a wide range of values for which AutoTIDBD out-performs ordinary TD.

While FIG. 7 suggests that AutoTIDBD is insensitive to the setting of $\theta$, it doesn't show how sensitive AutoTIDBD is in general. While the parameter study demonstrates stability on this particular problem, it does not describe the sensitivity in general. To be an acceptable step-size adaptation method, the range of values which yield reasonable error should be large, and those values should be mostly invariant across problems. That is, a good $\theta$ value for making one prediction should also be good $\theta$ value for most other predictions. In some situations, it may be useful for a step-size adaptation method to be as close to tuning-free as possible.

To assess this, different prediction problems were constructed using a variety of signals of interest from the hand of the robot. Predictions include wildly different signals, including the position, velocity, temperature, and load of the hand, alongside the EMG signals. Using the same underlying parameter settings of the previous experiment, different values of θ were varied between $10^0$ to $10^{-9}$ for all problems.

In FIG. 8, the average sum of the absolute error is depicted for each signal of interest at a variety of values of θ. To make the signals comparable, their error is translated. We may note that the optimal meta step-size values are not the same for each prediction, but they share a common trough where the range of values leads to acceptable error. While each algorithm has a unique tolerance to aggressive meta step-sizes, $θ=10^{-2}$ yields good performance for most values.

What may be interesting is that the two exceptions to this—the two predictions for which this meta step-size yields higher error is the prediction of joint activity—an ordinal value describing which joint the user is currently controlling. A possible explanation for this behaviour is that none of the features are highly correlated. As a result, AutoTIDBD tunes down the step-sizes for most features, stunting learning and driving the error higher. With smaller meta step-sizes this would take longer to occur. With larger meta step-size this would be faster, causing a larger long term error.

This extends AutoStep successfully to TD learning, bringing the original benefits of AutoStep to TD prediction methods. This AutoTIDBD meets my three criteria: it achieves errors lower than ordinary TD, it is able to tune relevant and irrelevant features, and I have now shown that it is insensitive to its meta step-size θ across a selection of prediction tasks.

Step-Sizes for Evaluating the Potential of a GVF

In previous work, step-size adaptation acts as feature learning: features relevant to a given prediction problem the step-sizes would increase and how for features which were irrelevant to a given problem the step-size values would shrink (Kearney et al.). On a per-feature basis, the step-sizes are providing information which describes how relevant that feature is to the prediction being made—the step-size is providing an evaluation of the learner's specification.

Figure 9A:
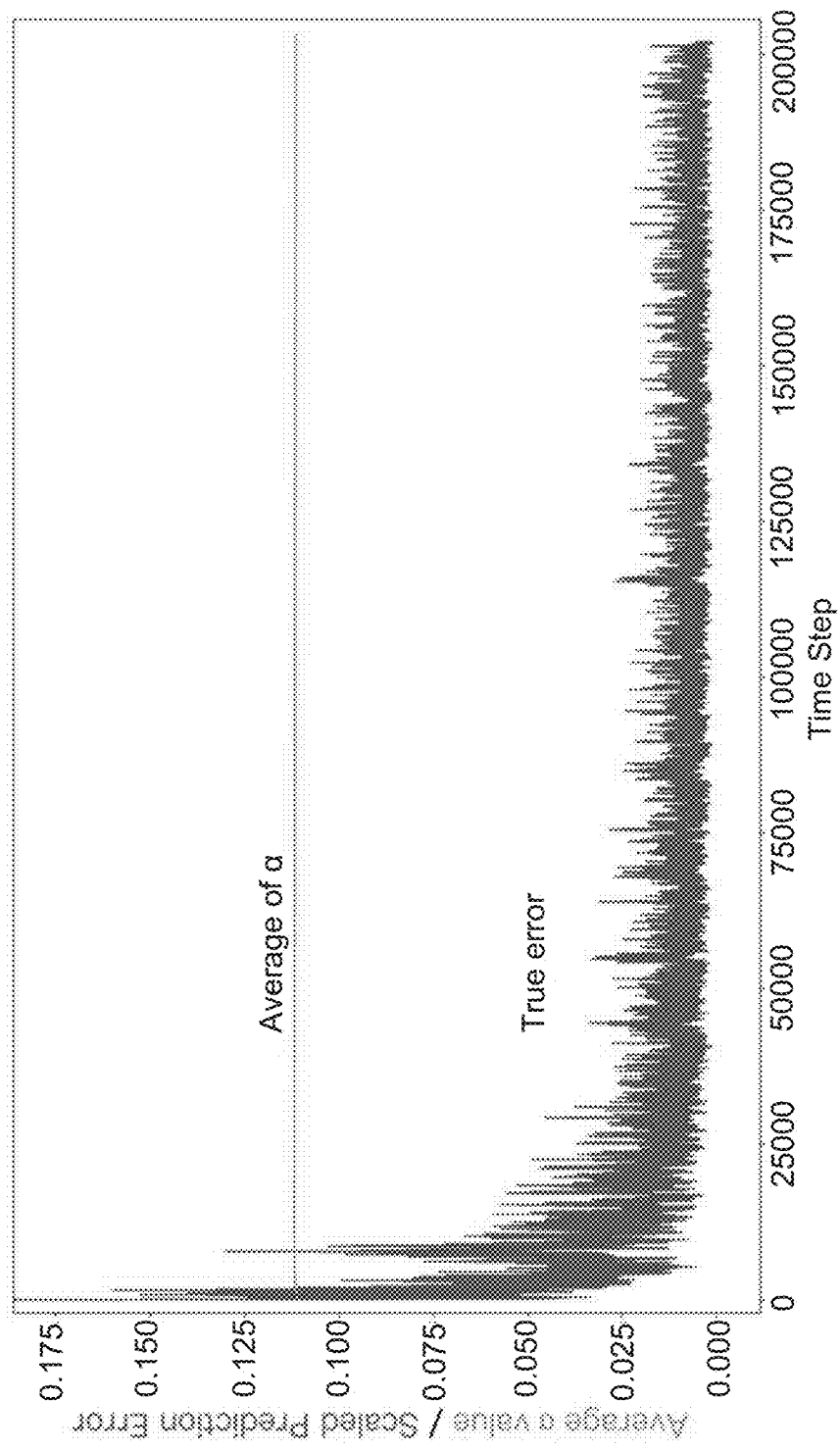
FIG. 9A is a graph illustrating an average step-size value versus the scaled absolute error of the prediction for hand prediction on an example robotic prosthetic box and blocks task.
Figure 9B:
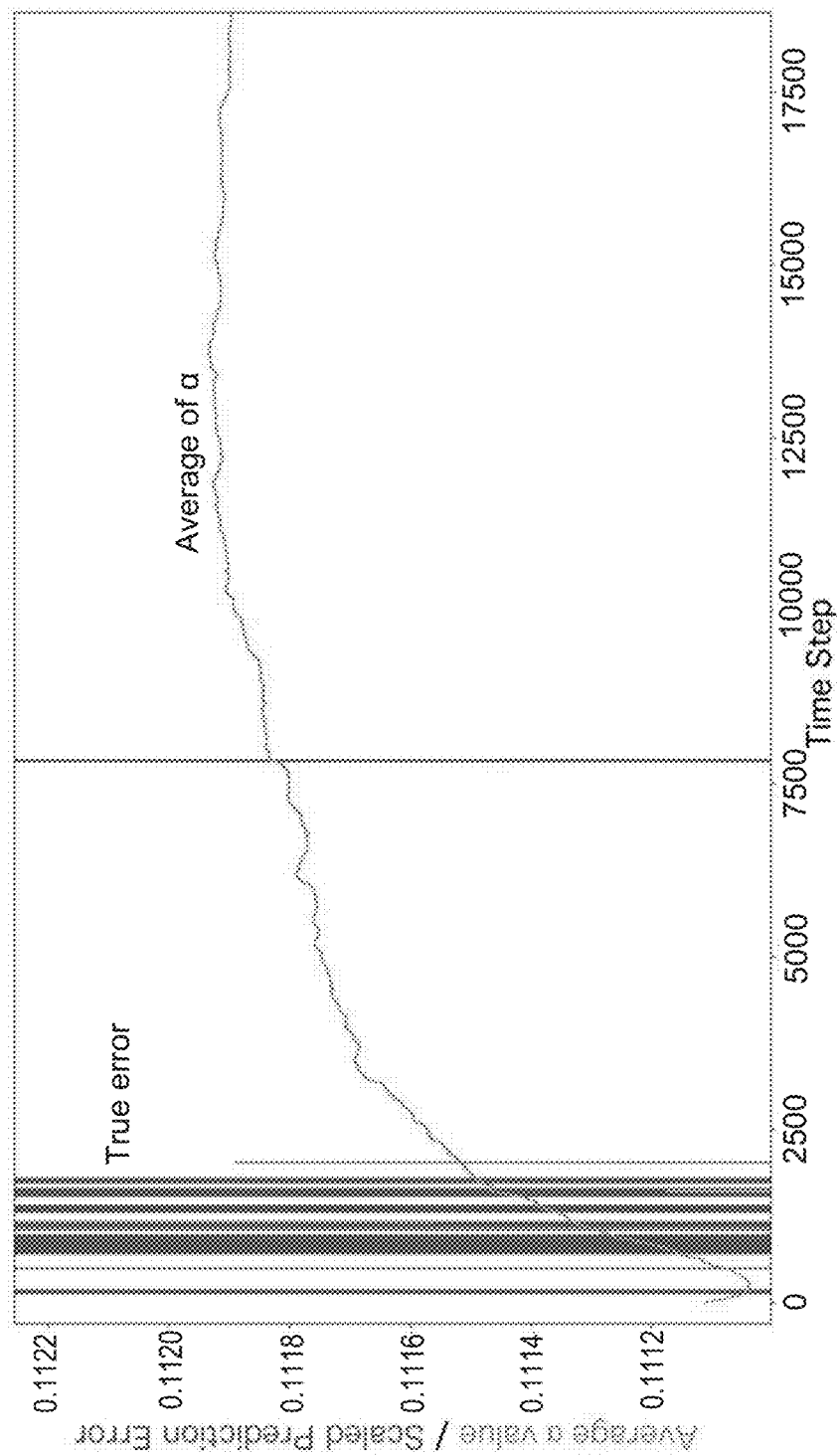
FIG. 9B is a graph illustrating a closeup of the early-learning average step-size value versus the scaled error of the hand prediction on the example robotic prosthetic box and blocks task.

This is not the only way which learned step-sizes could be used to evaluate a learner. If step-size of a single feature describes how relevant it is to a given task, then the average of the step-sizes describe how well the initial representation fits the prediction problem. In 11 the absolute error of the hand prediction is shown alongside the average step-size value. The error is scaled such that it is bounded between 0 and 1, enabling us to compare the change in error to the change in the absolute value of the step-size. In FIG. 9a, a full view of one run is shown. Notice that it's around 50000 time-steps when we see that the predictor has converged. There is a great deal of change between. When we take a look at the average step-size in early learning, a much different picture is painted. In FIG. 9b, we see that the average step-size value is not constant, but changes slightly over time. Even with a tuned initial step-size we see that for this well-constructed predictor the average step-size grow over time. Within 12000 time-steps we see the step-sizes level off to the value which they hover around for the remainder of the experiment. Before we even have a reliable measurement of error, our average step-size provides insight into the long-term performance.

Alongside the delay in evaluation, the Error is not always the best metric for evaluating the performance of a system. The error only describes how well a system is doing presently. We can take an average of the error, but that simply shifts the problem without entirely eliminating: the error is only describing the performance in a window of experience. A poorly specified learner may have low error because the signal of interest isn't changing a great deal.

Figure 11A:
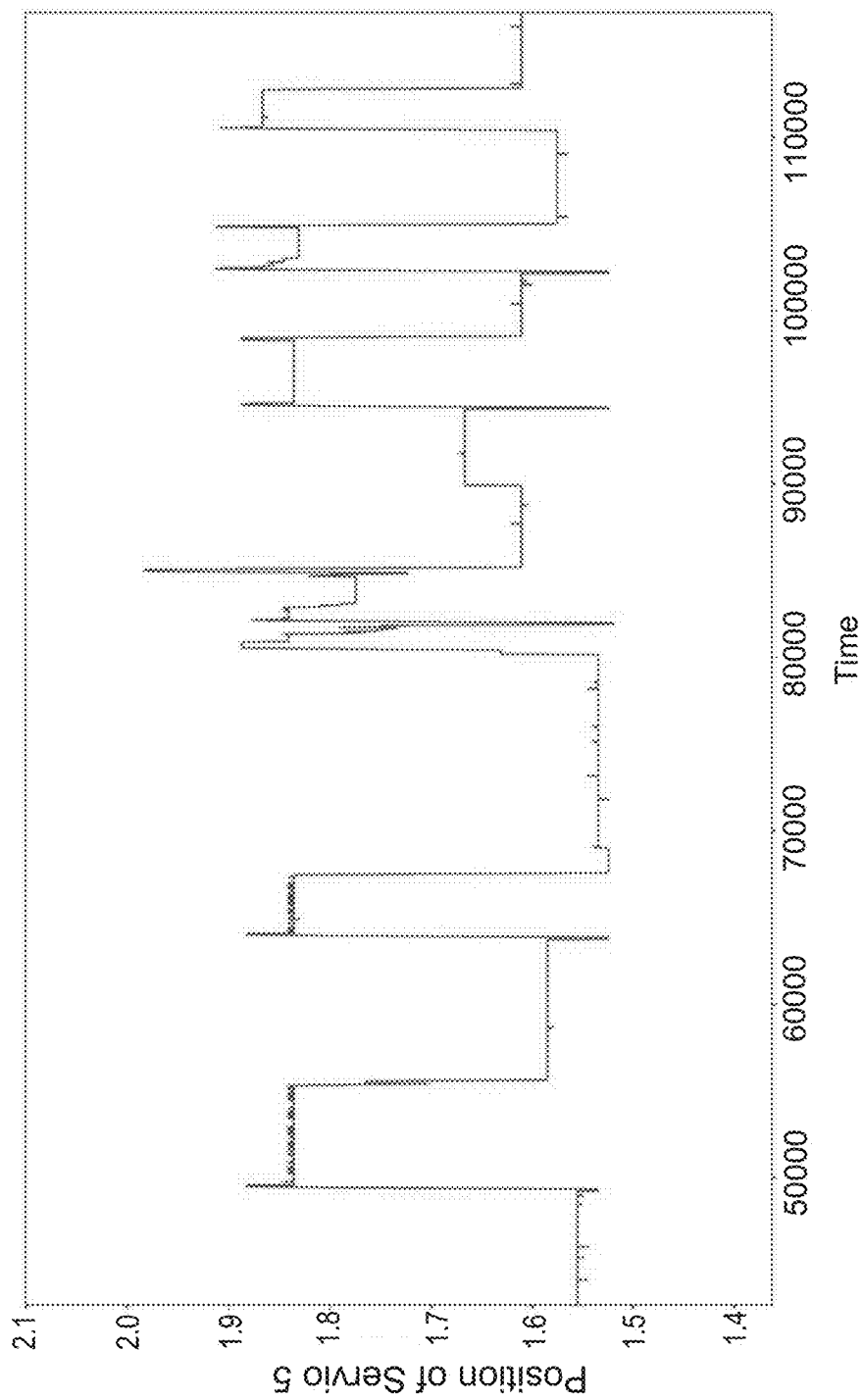
FIG. 11A is a graph illustrating a sample of the position signals from the hand of the robotic arm while performing a box and blocks task.

By far, the greatest drawback to using error is that it's difficult to calculate for TD learning. In FIG. 11A, the true-error is presented which is calculated using all of experience at the end of experiment. In reality, the error can only be approximated online; as a result, the reward would be time-delayed value which is calculated using a recorded history of the signal of interest. While this value may be approximated during the experiment with some delay, it cannot be observed in real-time online.

By using the sum of the step-sizes we look at the potential not just now, but for all components of our state-space. In addition, the learned step-sizes are values which are already calculated and directly observable online. This makes it an ideal value to use when evaluating a prediction.

The sum of all step-sizes can be seen as a description of how well the learner is specified, and how much potential the learner has in the future. What if we were to use the average of the step-sizes as a metric with which we could compare general value functions? The step-size value is invariant to the signal of interest we are trying to predict; for any given prediction signal, the step-sizes will be in the same range of values. This is an improvement over the error: comparing the error measures is challenging, especially during early learning. The errors are going to be strongly related to the actual values.

Figure 10A:
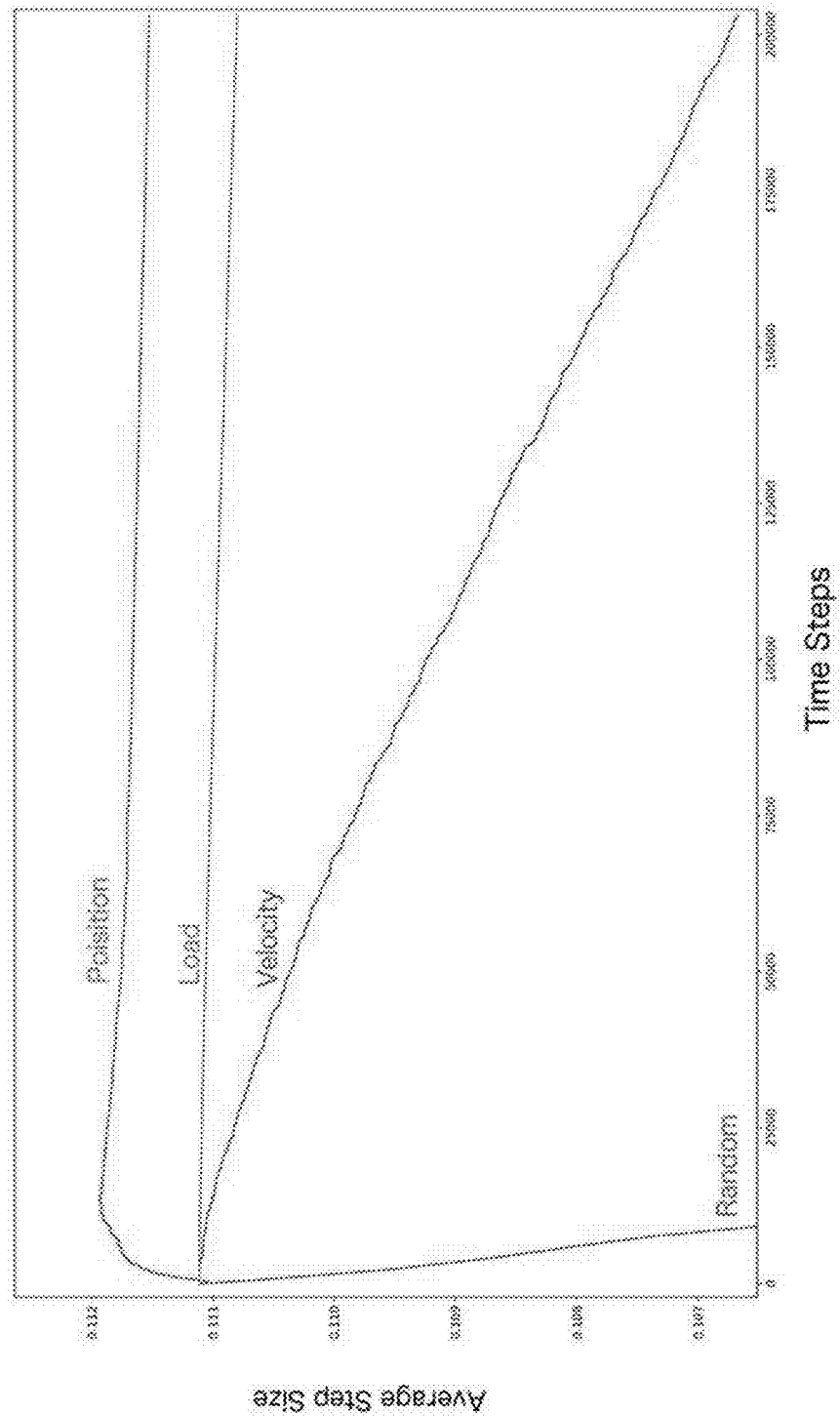
FIG. 10A is a graph illustrating a depiction of step-size values during the whole of an experiment.
Figure 10B:
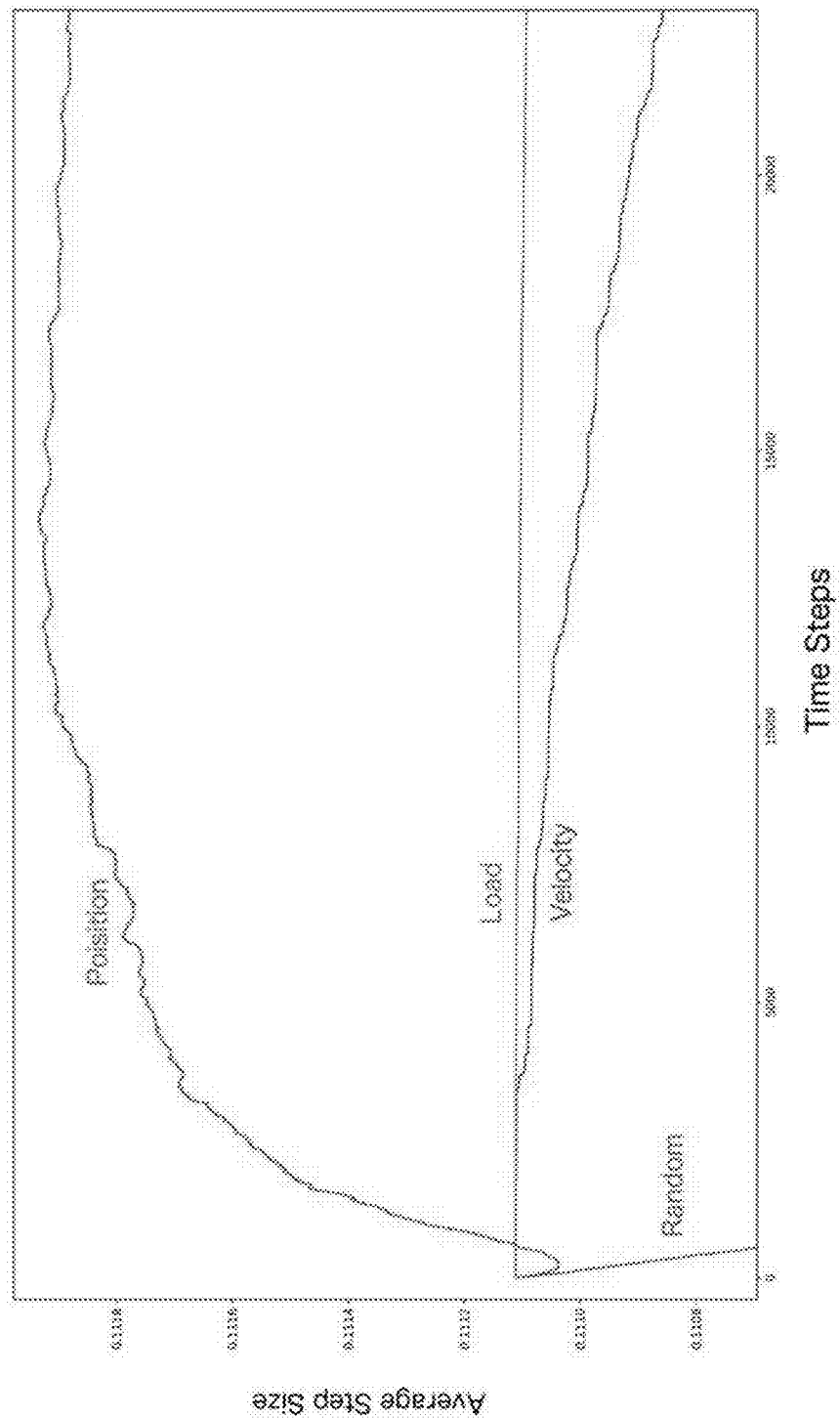
FIG. 10B is a graph illustrating a depiction of step-size values at the beginning of the experiment.

In FIG. 10, we assess the performance of four different predictions which share the same representation. The feature vector is constructed as described in section. The specification of the representation is hand-engineered to be best suited to predicting the position of the hand servo. The predictors which are being compared are the load, velocity, and the position of the hand servo. In addition an unlearnable predictor is added: one of the GVFs is predicting uniform random noise. A good comparator will give well specified with potential for learning high values and give poorly specified GVFs with little potential low values. In addition, signals which are relatively constant—and thus easily predicted by bias units—should be ranked lower than other.

In FIG. 10, we see that the predictor with the largest sum of step-sizes is the position predictor. This is expected as the representation was designed with predicting position in mind; the features will be most correlated with the position of the servo so it's sensible that the learner which is best according to the average step-size ranking is the is position.

While using the step-sizes as a metric for potential ranks the position as the best specified general value function, the predictor with the lowest average error overall is the load predictor. This is in fact a benefit. In FIG. 11A the signals being predicted are plotted. Immediately, we can see why it is load has a lower error: the signal itself is easier to anticipate. The task is moving relatively light balls from one side of a partition to another. As a result, the load doesn't change very frequently—there's a great deal of time between picking up a ball and placing it. In addition to the time between events, the load signal is quite low. In the section depicted, the value of the load is only ever between −0.5 and 0.2. In comparison, the load oscillates between 1.5 and 2 with greater inconsistency. The position of the gripper may change from grasp to grasp; the participant may grab on the ball in different ways causing the gripper to close varying amounts each time they pick up a ball. Similarly, they may open the gripper by varying amounts. This can be seen in varying of the different peaks and troughs in the hand position signal. By ranking predictions using their learned step-sizes, we don't penalize GVFs which are well specified, but are predicting challenging signals.

One area where the ability to rank GVFs using learned step-sizes might be immediately useful is the evaluation of sets of demons in a horde architecture. A horde of demons is a collection of GVFs where each individual GVF is predicting a signal of interest (Sutton et al., 2011). It has been suggested that these demons of GVFs may be layered in such a way that abstract knowledge is built up from observations grounded in the sensorimotor stream of a given system.

A current challenge for using the horde architecture is deciding how to create demons. In order to decide if a demon you created is worth-while, you must be able to evaluate it. An obvious choice for evaluating the performance of a predictor is it's error. While very direct, this has a few drawbacks. In order to get a reliable approximation of the error between the predicted return and the true discounted return of future reward you must observe the future rewards. That is, to get a reliable approximation of our error, we must wait several time-steps and observe future rewards. This isn't ideal, as we're never able to immediately assess our predictor's performance.

Previously, a way of adapting a vector of many step-sizes online for TD learning using Stochastic Meta Descent. It was concluded that the a limitation of TIDBD is the need to tune the meta-parameter. As described herein, in some embodiments, TIDBD's instability is addressed by taking a closer look at its causes, deriving multiple versions of TIDBD, and developing AutoTIDBD—an AutoStep inspired normalization to TIDBD. AutoTIDBD is less sensitive to $\theta$ than ordinary TD is to $\alpha$.

In some embodiments, the system/device such as Auto-TIDBD can in some examples be insensitive to the setting of its meta-parameters. Unlike TIDBD and ordinary TD, Auto-TIDBD can be stable, even for large values of $\lambda$. The discussion herein focuses specifically on on-policy predictions. In other embodiments, aspects of the present application may apply to off-policy methods, control methods, and two time-step methods.

In some situations, the use of step-sizes can be a metric for performance. In some experiments, it was demonstrated how the average value of a step-size could be seen to be a description of a GVF's potential. Using the step-sizes as a metric, it is proposed that GVFs in a horde of daemons could be evaluated online. In some situations, using the average value of a GVF's, the system may determine which GVFs might be suitable to eliminate from our horde, or what GVFs might be good candidates to learn about. Additional uses of step-sizes are not just limited to evaluation; the use of learned step-sizes as a driver for computational curiosity could be another potential application.

In certain situations, some embodiments, such as Auto-TIDBD, can provide a robust method for adapting step-sizes online and performing representation learning for TD learning, enabling potentially better solutions for life-long continual learning problems.

Figure 12:
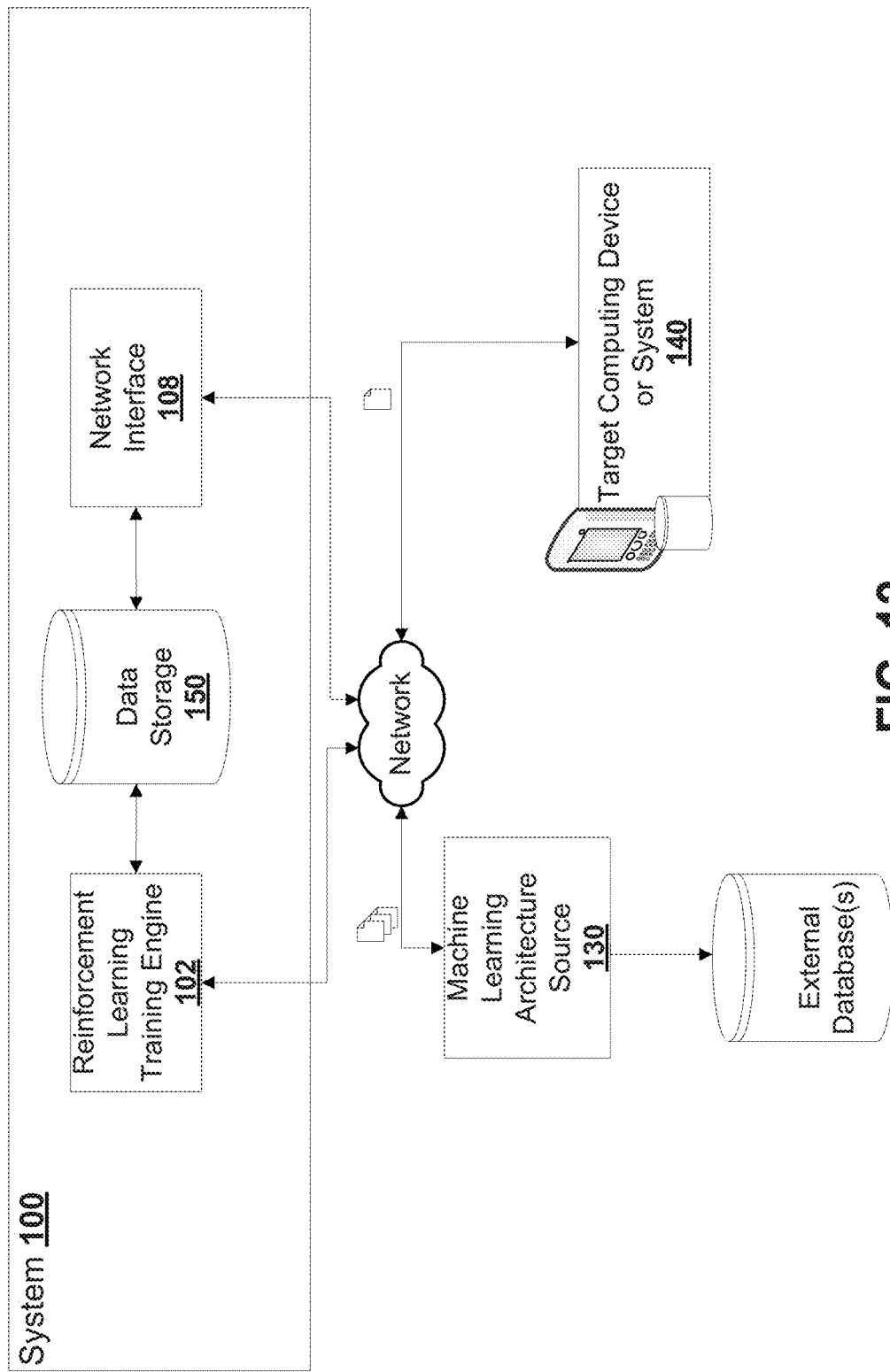
FIG. 12 is a block schematic of an example system or device for training a machine learning architecture, according to some embodiments.

FIG. 12 is a schematic block diagram of an example of a physical environment for a machine learning architecture training device, according to some embodiments. A system 100 configured for processing machine learning architectures such as neural networks, receiving a machine learning architecture (e.g., stored in the form of data sets) from a machine learning architecture source 130 is provided.

System 100 includes an reinforcement learning training engine 102. The training engine may be software (e.g., code segments compiled into machine code), hardware, embedded firmware, or a combination of software and hardware, according to various embodiments.

The training engine 102 is configured to receive one or more data sets representative of a neural network model, and to train the neural network using a step-size value which varies over time.

The neural network, step-size values, meta-weights, vectors, states and any other relevant data or parameter are stored in data storage 150, which is configured to maintain one or more data sets, including data structures storing linkages and other data. Data storage 150 may be a relational database, a flat data storage, a non-relational database, among others. In some embodiments, data storage 150 may store data representative of a model distribution set including one or more modified models based on a neural network model.

A networking interface 108 is configured to transmit data sets representative of the trained neural network, for example, to a target data storage or data structure. The target data storage or data structure may, in some embodiments, reside on a computing device or system 140 such as a mobile device.

The system 100, in some embodiments, is an information management and database system that maintains data storage of neural networks, and processes neural networks for transformation into more robust neural networks. Data structures are initialized, allocated, and maintained for storing the neural networks.

For example, the system 100 of some embodiments is configured to output a trained neural network for provisioning onto a target computing device 140. The output, in this scenario, for example, can include a data payload encapsulating the trained neural network data structure, populated with the trained neural network, among others. The encapsulated data payload may be provided in the form of an electronic file transfer message, fixated on a physical, non-transitory storage medium, among others.

Figure 13:
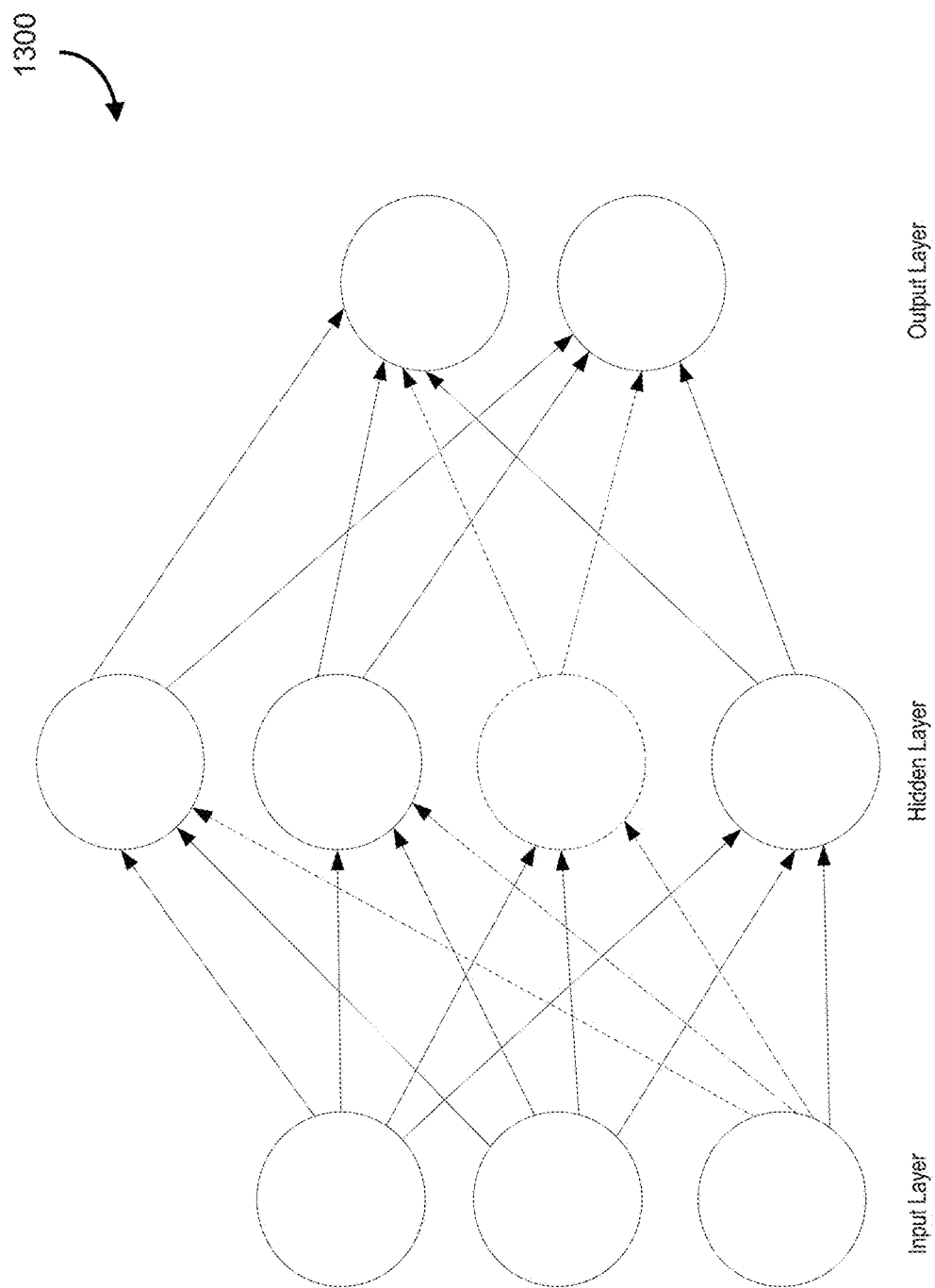
FIG. 13 is a schematic diagram of an example neural network, according to some embodiments.

FIG. 13 is a schematic diagram of an example neural network 1300, according to some embodiments. In this example, the neural network includes an input layer, a hidden layer, and an output layer.

Figure 14:
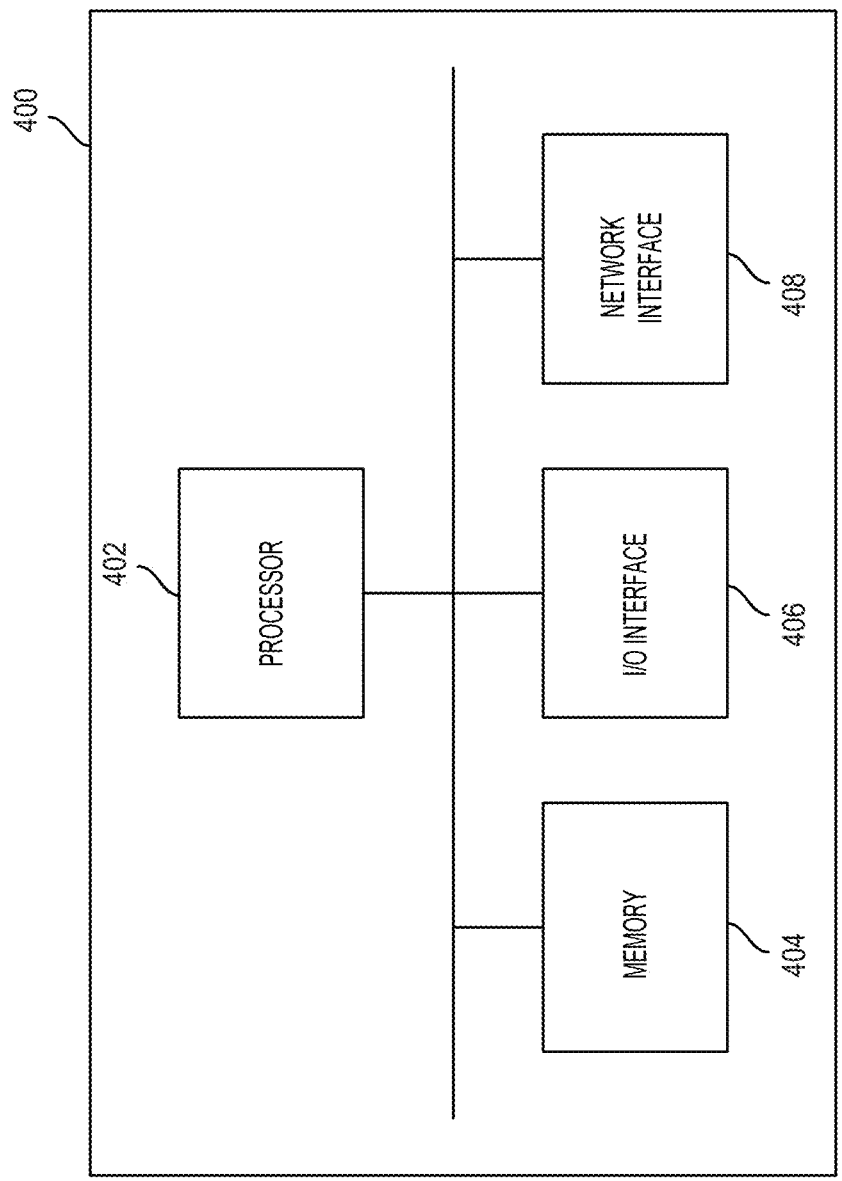
FIG. 14 is a block diagram of an example computing device, according to some embodiments.

FIG. 14 is a schematic block diagram of an example computing device 400, according to some embodiments. There is provided a schematic diagram of computing device 400, exemplary of an embodiment. As depicted, computing device 400 includes at least one processor 402, memory 404, at least one I/O interface 406, and at least one network interface 408. The computing device 400 is configured as a machine learning server adapted to dynamically maintain one or more neural networks.

Each processor 402 may be a microprocessor or microcontroller, a digital signal processing (DSP) processor, an integrated circuit, a field programmable gate array (FPGA), a reconfigurable processor, a programmable read-only memory (PROM), or combinations thereof.

Memory 404 may include a computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM).

Each I/O interface 406 enables computing device 400 to interconnect with one or more input devices, such as a keyboard, mouse, camera, touch screen and a microphone, or with one or more output devices such as a display screen and a speaker.

Figure 15:
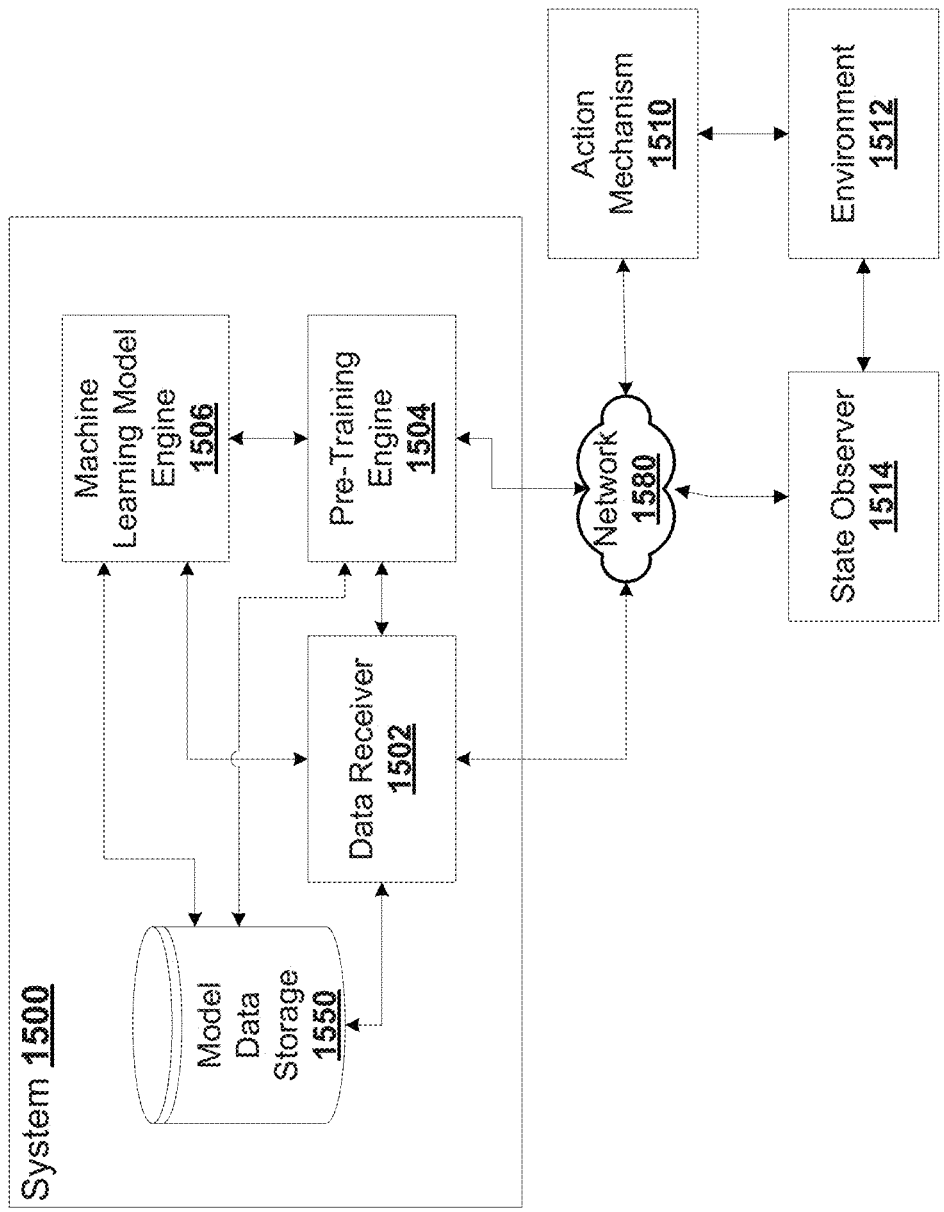
FIG. 15 is a schematic diagram showing aspects of an example system or machine learning architecture.

FIG. 15 is a block schematic of an example system 1500 for a machine learning architecture. Various embodiments are directed to different implementations of systems described. The system 1500 is adapted for machine learning with adaptive step sizes. In some embodiments, the system includes at least one processor and computer readable memory. In some embodiments, the demonstrations may be performed by a human actor, who may be non-expert, or may be performed by a non-human actor, such as another machine.

System 1500 may be a computer server-based system, for example, residing in a data center or a distributed resource "cloud computing" type infrastructure. System 1500 may include a computer server having at least one processor and configured for dynamically maintaining a model for conducting the one or more sequential tasks and improving the model over a training period to optimize a performance variable through reinforcement learning on a model data storage 1550 (e.g., a database).

In some embodiments, system 1500 is adapted for providing a machine learning architecture which can rely on/act based on one or more state(s) and/or observations.

The system 1500 is implemented using electronic circuits and computer components, and aspects can be adapted to pre-train the machine learning model to improve convergence or accuracy based on the pre-training data sets.

Observation data can be received in the form of encapsulated data structure elements, for example, as recorded by state observer 1514 and/or observed through recorded and processed data sets of the agent associated with action mechanism 1510 interacting with an environment 1512, and the associated inputs indicative of the actions taken by the agent.

The states of the environment can be observed by a state observer 1514, for example, by recording aspects or features of the environment. In some embodiments, the state includes image data of an interface. The states may be associated with different rewards/penalties, for example, such as a time-elapsed in a game (e.g., as extracted through optical character recognition from a time-display element), a score (e.g., as extracted through optical character recognition from a score-display element), among others.

In another example, if the agent is being used for game playing where there is a clearly defined win/loss condition, the reward may simply be provided tracked as a 1 for a win and a 0 for a loss. Where the states cannot be directly tied to specific win/loss conditions (e.g., in a board-game where the depth required to analyze victory/failure states is too distant), a proxy reward/penalty may be assigned (e.g., based on a positional evaluation or a heuristic).

In some embodiments, the state observer 1514 can include or can receive observation data from one or more sensors, electronic environment (e.g. video game) interfaces, actuators, outputs or communications from one or more devices, and/or any other signals from which the system can be trained and/or to which the system can react.

A data receiver 1502 is configured for receiving data sets representative of the observations and/or states.

In some embodiments, data receiver 1502 receives data sets from multiple data sources.

In some embodiments, historical observation data is stored in memory and can be used to generate historical or otherwise time-dependent observation data sets for the current observation time. In some embodiments observation times can be periodic, sporadic, or at any defined, triggered, or random time.

The outputs as provided in the instruction sets may include actions to be executed that impact the environment, and for example, cause state transitions to occur. The observations may be tracked by a state observer, which may, for example, include display signal tap to record interface display aspects, among others.

A machine learning model engine 1506 processes received inputs and data sets, and iterates a stored model to update the model over a period of time to generate one or more outputs, which may include instruction sets to be transmitted across network 1580 to an action mechanism 1510. The model may represent a neural network including a group of nodes interconnected by one or more connections, the group of nodes including at least a subgroup of input nodes, a subgroup of hidden nodes, and a subgroup of output nodes.

A feature extraction mechanism, or a feature extractor, may be provided in the form of a pre-training engine 1504 configured for processing the one or more data sets representative of the monitored demonstrations to extract one or more features, the extracted one or more features used to initialize the neural network to reduce an initial exploration rate that would otherwise result in training the neural network.

As described in various embodiments herein, engine 1504 can be configured to determine a next action based on the machine learning model stored in model data storage 1550 (e.g., a Q-learning policy).

After an action is executed, machine learning engine 1506 observes the outcome and associated rewards/states, and updates the machine learning model stored in model data storage 1550.

In some embodiments, an optional learning speed monitoring engine 1508 may be provided. Engine 1508 is configured, in some embodiments to track the progress of the machine learning model in achieving rewards, tracked in an optional training performance storage 1552.

In some embodiments, signals between the state observer and the machine learning architecture or system 1500 can be over one or more communication network(s). In some embodiments, the network 1580 can be one or more wireless or wired communication networks.

In some embodiments, signals between an action mechanism and the machine learning architecture or system 1500 can be over the same or different communication network(s).

In some embodiments, the state observer 1514 and/or the action mechanism 1510 may be integrated with or coupled to the system 1500. In some embodiments, the state observer 1514 and/or the action mechanism 1510 may communicate via a bus, PCB, integrated circuit connection, or any other physical or wireless connection to the machine learning architecture.

In some embodiments, the state observer 1514 receiving one or more observation data sets representing one or more observations associated with at least a portion of a state of an environment.

Based on one or more observation data sets received from the state observer, the system 1500 can, in some embodiments, be configured to training the machine learning architecture with the one or more observation data sets, where the training includes updating the plurality of weights based on an error value, and at least one time-varying step-size value;

wherein the at least one step-size value is based on a set of meta-weights which vary based on a stochastic meta-descent.

In some embodiments, the system is configured to trained the machine learning architecture based on the equations and algorithms described herein.

In some embodiments, the stochastic meta-descent is defined using a full gradient.

In some embodiments, the stochastic meta-descent is defined using a semi-gradient.

In some embodiments, a trained system or device, or a machine learning architecture based on weights and/or other values and/or structures from a trained system or device as described herein may be used to determine an action for an agent in an environment.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

The following references are hereby incorporated by reference in their entireties:

Barnard, E. (1993). Temporal-difference methods and markov models. IEEE Transactions on Systems, Man, and Cybernetics, 23(2):357-365.

Dabney, W. and Barto, A. G. (2012). Adaptive step-size for online temporal difference learning. In Association for the Advancement of Artificial Intelligence (AAAI).

Dawson, M. R., Sherstan, C., Carey, J. P., Hebert, J. S., and Pilarski, P. M. (2014). Development of the bento arm: An improved robotic arm for myoelectric training and research. volume 14, pages 60-64. Citeseer.

Edwards, A. L., Dawson, M. R., Hebert, J. S., Sherstan, C., Sutton, R. S., Chan, K. M., and Pilarski, P. M. (2016a). Application of real-time machine learning to myoelectric prosthesis control: A case series in adaptive switching. Prosthetics and orthotics international, 40(5):573-581.

Edwards, A. L., Hebert, J. S., and Pilarski, P. M. (2016b). Machine learning and unlearning to autonomously switch between the functions of a myoelectric arm. In 2016 6th IEEE International Conference on, Biomedical Robotics and Biomechatronics (BioRob), pages 514-521. IEEE.

Mahmood, A. R., Sutton, R. S., Degris, T., and Pilarski, P. M. (2012). Tuning-free step-size adaptation. In 2012 IEEE International Conference on Acoustics, Speech and Signal Processing (ICASSP), pages 2121-2124. IEEE.

Schraudolph, N. N. (1999). Local gain adaptation in stochastic gradient descent. In Artificial Neural Networks, 1999. ICANN 99. Ninth International Conference on (Conf. Publ. No. 470), volume 2, pages 569-574. IET.

Sherstan, C., Modayil, J., and Pilarski, P. M. (2015). A collaborative approach to the simultaneous multi-joint control of a prosthetic arm. In 2015 IEEE International Conference on Rehabilitation Robotics (ICORR), pages 13-18. IEEE.

Sutton, R. S. (1992). Adapting bias by gradient descent: An incremental version of delta-bar-delta. In Association for the Advancement of Artificial Intelligence (AAAI), pages 171-176.

Sutton, R. S. and Barto, A. G. (1998). Reinforcement learning: An introduction. MIT press Cambridge, 1 edition.

Sutton, R. S., Modayil, J., Delp, M., Degris, T., Pilarski, P. M., White, A., and Precup, D. (2011). Horde: A scalable real-time architecture for learning knowledge from unsupervised sensorimotor interaction. In The 10th International Conference on Autonomous Agents and Multiagent Systems-Volume 2, pages 761-768. International Foundation for Autonomous Agents and Multiagent Systems.

van Seijen, H., Mahmood, A. R., Pilarski, P. M., Machado, M. C., and Sutton, R. S. (2016). True online temporal-difference learning. Journal of Machine Learning Reasearch (JMLR), 17(145):1-40.

What is claimed is:

1. A system for a machine learning architecture, the system comprising:
    at least one memory storing the machine learning architecture a neural network and at least one processor configured to provide the machine learning architecture for estimating a value function for at least a portion of a given state, the value function defined at least in part on a plurality of weights of the neural network;
    the at least one processor configured for:
        receiving one or more observation data sets representing one or more observations associated with at least a portion of a state of an environment in which a computer-instructable agent operates;
        training the neural network with the one or more observation data sets, wherein the training includes updating the plurality of weights based on: an error value and at least one time-varying step-size value; wherein the at least one time-varying step-size value is based on a set of meta-weights which vary based on a stochastic meta-descent and a trace of past updates to the plurality of weights;
        generating signals for instructing the computer-instructable agent to perform an action based on the machine learning architecture and an observed state of the environment;
        initializing vectors $h \in 0^n$, $z \in 0^n$; and
        repeating for each observation data set s' and reward R;
            determining $\delta \leftarrow R + \gamma \omega^T \phi(s') - \omega^T \phi(s)$;
            for elements i=1, 2, ..., n of the observation data set s':

$\beta_i \leftarrow \beta_i + \theta \delta [\gamma \phi(s_{t+1}) - \phi(s_t)] H_i$ $\alpha_i \leftarrow e^{\beta_i}$ $z_i \leftarrow z_i \gamma \lambda + \phi_i(s)$ $\omega_i \leftarrow \omega_i + \alpha_i \delta z_i$ determining: $H_i \leftarrow H_i[1 + \alpha_i z_i[\gamma \phi_i(s_{t+1}) - \phi_i(s_t)]] + \alpha_i \delta z_i$; and
            updating a current state s based on the observation data set s';
            wherein $\beta_i$ represents the set of meta-weights, $\theta$ is a meta step-size value, $\delta$ is a temporal difference error, $\alpha$ is a step size, $H_i$ is a trace of past updates to the plurality of weights w, $\phi(s)$ is a feature vector approximating state s, $\gamma$ is a discount factor, $\lambda$ represents an input value, and z represent eligibility traces.

2. The system of claim 1 wherein the stochastic meta-descent is defined using a full gradient.

3. The system of claim 1 wherein the stochastic meta-descent is defined using a semi-gradient.

4. The system of claim 1, comprising: updating the set of meta-weights based on:

$$\beta_i(t+1) = \beta_i(t) - \frac{1}{2}\theta \frac{\partial \delta^2(t)}{\partial \beta_i},$$

where $\beta_i(t)$ represents meta-weight i of the set of meta-weights at time step t, $\theta$ is a meta step-size value, $\partial$ represents a mathematical operator of taking a partial derivative, and $\delta(t)$ is a temporal difference error at the time step t.

5. The system of claim 1, comprising: updating the set of meta-weights based on:

$$\beta_i(t+1) \approx \beta_i(t) - \frac{1}{2}\theta \frac{\partial \delta^2(t)}{\partial w_i(t)} \frac{\partial w_i(t)}{\partial \beta_i},$$

where $\beta_i(t)$ represents meta-weight i of the set of meta-weights at time step t, $\theta$ is a meta step-size value, $\delta(t)$ is a temporal difference error at the time step t, $\partial$ represents a mathematical operator of taking a partial derivative, and $w_i(t)$ represents a weight i of the plurality of weights at the time step t.

6. The system of claim 1, wherein the at least one processor is configured for: applying new inputs to the machine learning architecture with the updated weights.

7. The system of claim 1, wherein the machine learning architecture is at least a portion of a reinforcement learning system.

8. The system of claim 1, wherein the value function is at least a component of a representation of a position of a robot component, and wherein the value function is an input to a robot control system.

9. A system for a machine learning architecture, the system comprising:
    at least one memory storing the machine learning architecture comprising a neural network and at least one processor configured to provide the machine learning architecture for estimating a value function for at least a portion of a given state, the value function defined at least in part on a plurality of weights of the neural network;
    the at least one processor configured for:
        receiving one or more observation data sets representing one or more observations associated with at least a portion of a state of an environment in which a computer-instructable agent operates;
        training the neural network with the one or more observation data sets, wherein the training includes updating the plurality of weights based on; an error value and at least one time-varying step-size value; wherein the at least one time-varying step-size value is based on a set of meta-weights which vary based on a stochastic meta-descent and a trace of past updates to the plurality of weights;
        generating signals for instructing the computer-instructable agent to perform an action based on the machine learning architecture and an observed state of the environment;
        initializing vectors $h \in 0^n$, $z \in 0^n$; and
        repeating for each observation data set s' and reward R;
            determining $\delta \leftarrow R + \gamma \omega^T \phi(s') - \omega^T \phi(s)$;
            for elements i=1, 2, ..., n of the observation data set s':
            determining:

$\beta_i \leftarrow \beta_i + \theta \delta \phi_i(s) H_i$ $\alpha_i \leftarrow e^{\beta_i}$ $z_i \leftarrow z_i \gamma \lambda + \phi_i(s)$ $\omega_i \leftarrow \omega_i + \alpha_i \delta z_i$ $H_i \leftarrow H_i[1 + \alpha_i z_i]^+ + \alpha_i \delta z_i$; and updating a current state s based on the observation data set s';

wherein $\beta_i$ represents the set of meta-weights, $\theta$ is a meta step-size value, $\delta$ is a temporal difference error, $\alpha$ is a step size, $H_i$ is a trace of past updates to the plurality of weights w, $\phi$(s) is a feature vector approximating state s, $\gamma$ is a discount factor, $\lambda$ represents an input value, and z represent eligibility traces.

10. A computer-implemented method for a machine learning architecture comprising a neural network for estimating a value function for at least a portion of a given state, the value function defined at least in part on a plurality of weights of the neural network, the method comprising:
receiving one or more observation data sets representing one or more observations associated with at least a portion of a state of an environment in which a computer-instructable agent operates; and
training the neural network with the one or more observation data sets, wherein the training includes updating the plurality of weights based on: and an error value and at least one time-varying step-size value; wherein the at least one time-varying step-size value is based on a set of meta-weights which vary based on a stochastic meta-descent and a trace of past updates to the plurality of weights;
generating signals for instructing the computer-instructable agent to perform an action based on the machine learning architecture and an observed state of the environment;
initializing vectors h∈$0^n$, z∈$0^n$; and
repeating for each observation data set s' and reward R; determining $\delta \leftarrow R + \gamma \omega^T \phi(s') - \omega^T \phi(s)$;
for elements i=1, 2, . . . , n of the observation data set s':

$\beta_i \leftarrow \beta_i + \theta \delta [\gamma \phi(s_{t+1}) - \phi(s_t)] H_i$ $\alpha_i \leftarrow e^{\beta_i}$ $z_i \leftarrow z_i \gamma \lambda + \phi_i(s)$ $\omega_i \leftarrow \omega_i + \alpha_i \delta z_i$ determining: $H_i \leftarrow H_i [1 + \alpha_i z_i [\gamma \phi_i(s_{t+1}) - \phi_i(s_t)]] + \alpha_i \delta z_i$; and
updating a current state s based on the observation data set s';
wherein $\beta_i$ represents the set of meta-weights, $\theta$ is a meta step-size value, $\delta$ is a temporal difference error, $\alpha$ is a step size, $H_i$ is a trace of past updates to the plurality of weights w, $\phi$(s) is a feature vector approximating state s, $\gamma$ is a discount factor, $\lambda$ represents an input value, and z represent eligibility traces.

11. The method of claim 10 wherein the stochastic meta-descent is defined using a full gradient.

12. The method of claim 10 wherein the stochastic meta-descent is defined using a semi-gradient.

13. The method of claim 10, comprising: updating the set of meta-weights based on:

$$\beta_i(t+1) = \beta_i(t) - \frac{1}{2}\theta \frac{\partial \delta^2(t)}{\partial \beta_i},$$

wherein $\beta_i(t)$ represents meta-weight i of the set of meta-weights at time step t, $\theta$ is a meta step-size value, $\partial$ represents a mathematical operator of taking a partial derivative and $\delta$(t) is a temporal difference error at the time step t.

14. The method of claim 10, comprising: updating the set of meta-weights based on:

$$\beta_i(t+1) \approx \beta_i(t) - \frac{1}{2}\theta \frac{\partial \delta^2(t)}{\partial w_i(t)} \frac{\partial w_i(t)}{\partial \beta_i},$$

wherein $\beta_i(t)$ represents meta-weight i of the set of meta-weights at time step t, $\theta$ is a meta step-size value, $\delta$(t) is a temporal difference error at the time step t, $\partial$ represents a mathematical operator of taking a partial derivative, and $w_i(t)$ represents a weight i of the plurality of weights at the time step t.

15. The method of claim 10, comprising: applying new inputs to the machine learning architecture with the updated weights.

16. The method of claim 10, wherein the machine learning architecture is at least a portion of a reinforcement learning system.

17. The method of claim 10, wherein the value function is at least a component of a representation of a position of a robot component, and the value function is an input to a robot control system.

18. A computer-implemented method for a machine learning architecture comprising a neural network for estimating a value function for at least a portion of a given state, the value function defined at least in part on a plurality of weights of the neural network, the method comprising:
receiving one or more observation data sets representing one or more observations associated with at least a portion of a state of an environment in which a computer-instructable agent operates; and
training the neural network with the one or more observation data sets, wherein the training includes updating the plurality of weights based on; an error value and at least one time-varying step-size value; wherein the at least one time-varying step-size value is based on a set of meta-weights which vary based on a stochastic meta-descent and a trace of past updates to the plurality of weights;
generating signals for instructing the computer-instructable agent to perform an action based on the machine learning architecture and an observed state of the environment;
initializing vectors h∈$0^n$, z∈$0^n$; and
repeating for each observation data set s' and reward R; determining $\delta \leftarrow R + \gamma \omega^T \phi(s') - \omega^T \phi(s)$;
for elements i=1, 2, . . . , n of the observation data set s':
determining:

$\beta_i \leftarrow \beta_i + \theta \delta \phi_i(s) H_i$ $\alpha_i \leftarrow e^{\beta_i}$ $z_i \leftarrow z_i \gamma \lambda + \phi_i(s)$ $\omega_i \leftarrow \omega_i + \alpha_i \delta z_i$ $H_i \leftarrow H_i [1 + \alpha_i z_i]^+ + \alpha_i \delta z_i$; and updating a current state s based on the observation data set s';
wherein $\beta_i$ represents the set of meta-weights, $\theta$ is a meta step-size value, $\delta$ is a temporal difference error, α is a step size, $H_i$ is a trace of past updates to the plurality of weights w, $\phi(s)$ is a feature vector approximating state s, γ is a discount factor, λ represents an input value, and z represent eligibility traces.

19. A device or system for determining a potential action in an observed environment, the device or system comprising:
- at least one memory storing the machine learning architecture comprising a neural network and at least one processor configured to provide a machine learning architecture for estimating a value function for at least a portion of a given state of the observed environment in which a computer-instructable agent operates, and generate one or more signals for communicating or causing the potential action to be taken by the computer-instructable agent based on the value function;
- wherein the neural network was trained based on updating a plurality of weights of the neural network in the machine learning architecture based on: an error value and at least one time-varying step-size value; wherein the at least one time-varying step-size value is based on a set of meta-weights which vary based on a stochastic meta-descent and a trace of past updates to the plurality of weights;

wherein the training of the neutral network comprises;
- initializing vectors $h \in 0^n$, $z \in 0^n$; and
- repeating for each observation data set s' and reward R;
- determining $\delta \leftarrow R + \gamma \omega^T \phi(s') - \omega^T \phi(s)$;
- for elements i=1, 2, . . . , n of the observation data set s':

$\beta_i \leftarrow \beta_i + \theta \delta [\gamma \phi(s_{t+1}) - \phi(s_t)] H_i$ $\alpha_i \leftarrow e^{\beta_i}$ $z_i \leftarrow z_i \gamma \lambda + \phi_i(s)$ $\omega_i \leftarrow \omega_i + \alpha_i \delta z_i$

- determining: $H_i \leftarrow H_i[1 + \alpha_i z_i[\gamma \phi_i(s_{t+1}) - \phi_i(s_t)]] + \alpha_i \delta z_i$; and
- updating a current state s based on the observation data set s';

wherein $\beta_i$ represents the set of meta-weights, θ is a meta step-size value, δ is a temporal difference error, α is a step size, $H_i$ is a trace of past updates to the plurality of weights w, $\phi(s)$ is a feature vector approximating state s, γ is a discount factor, λ represents an input value, and z represent eligibility traces.

* * * * *